(No Model.) 9 Sheets—Sheet 1.

J. H. KNOWLES.
PAPER FEEDING MACHINE.

No. 544,764. Patented Aug. 20, 1895.

WITNESSES:

INVENTOR:
John H. Knowles
By his atty (No Model.) 9 Sheets—Sheet 2.

J. H. KNOWLES.
PAPER FEEDING MACHINE.

No. 544,764. Patented Aug. 20, 1895.

WITNESSES:

INVENTOR:
John H Knowles
By his atty (No Model.) 9 Sheets—Sheet 3.

J. H. KNOWLES.
PAPER FEEDING MACHINE.

No. 544,764. Patented Aug. 20, 1895.

WITNESSES:
INVENTOR:

(No Model.) 9 Sheets—Sheet 6.

J. H. KNOWLES.
PAPER FEEDING MACHINE.

No. 544,764. Patented Aug. 20, 1895.

WITNESSES: INVENTOR:

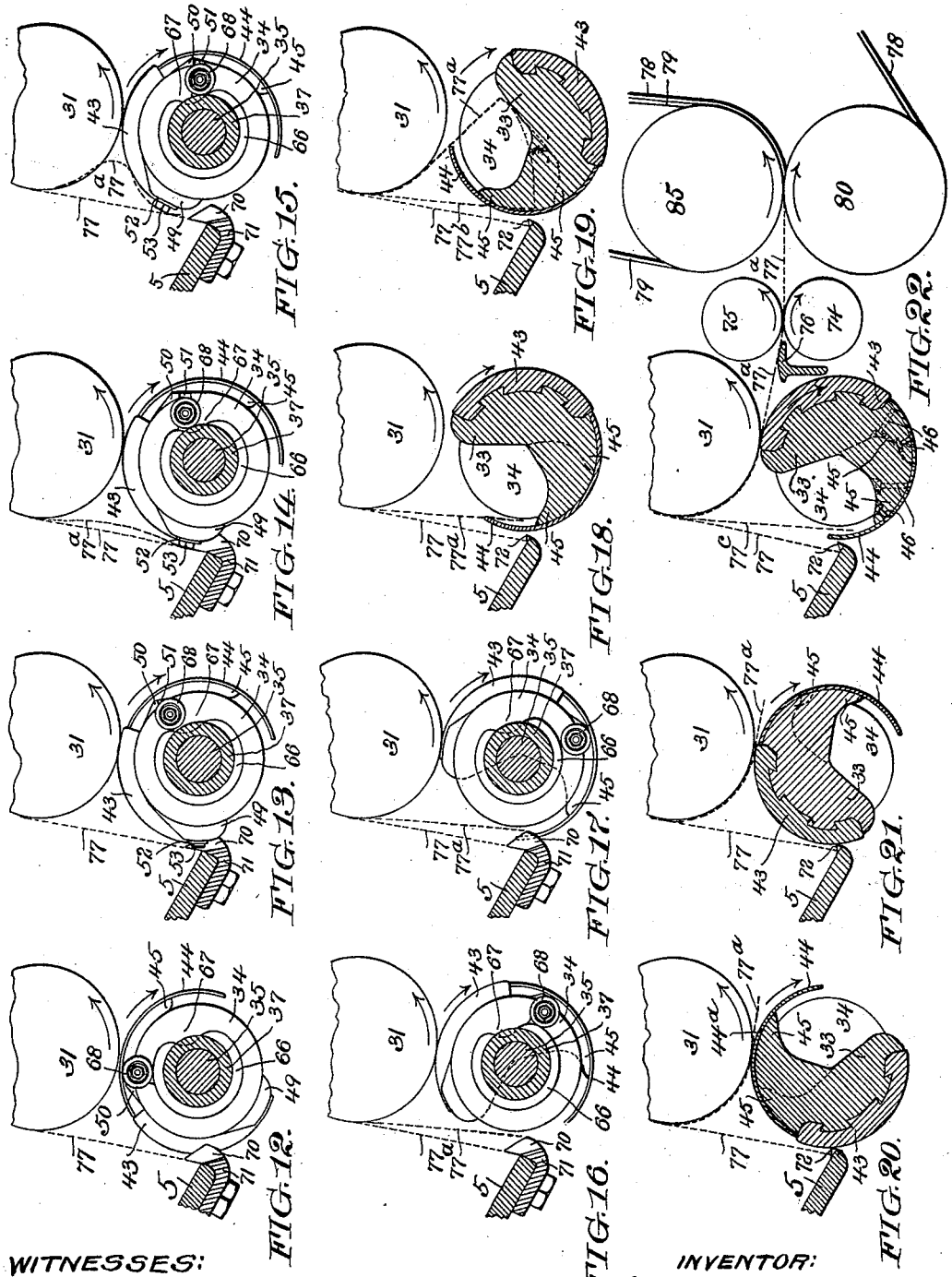

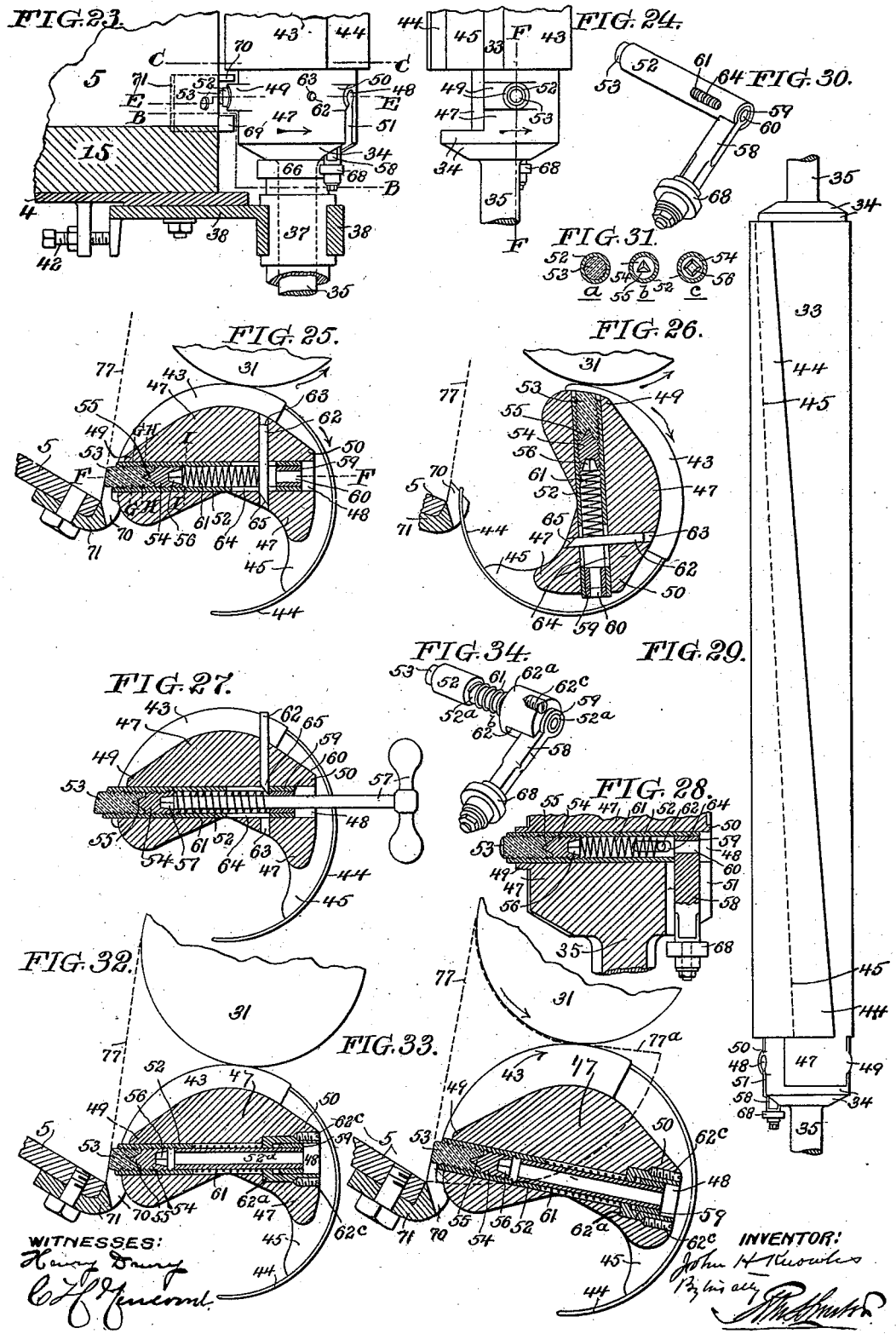

(No Model.) 9 Sheets—Sheet 9.
J. H. KNOWLES.
PAPER FEEDING MACHINE.
No. 544,764. Patented Aug. 20, 1895.
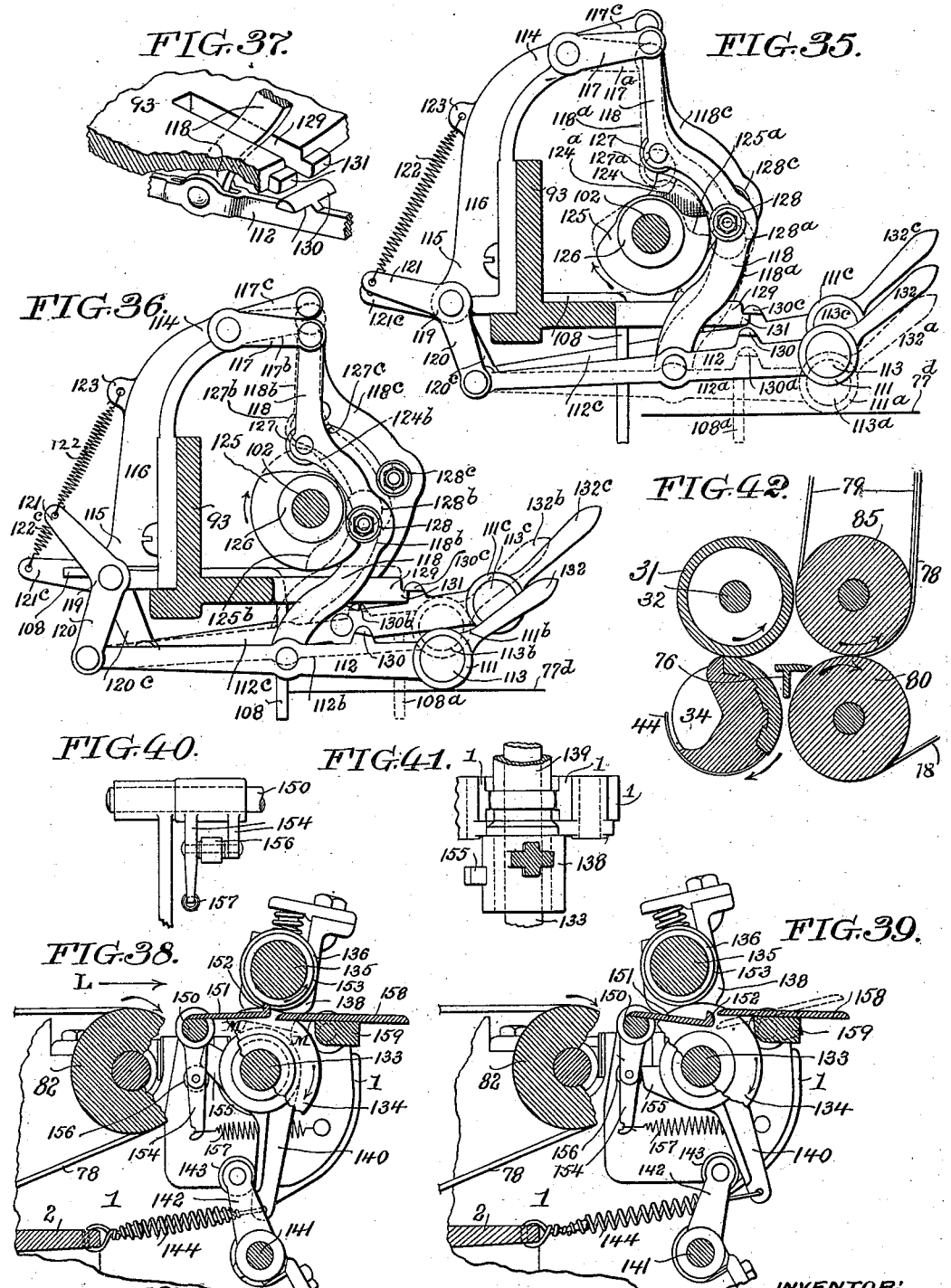
WITNESSES: INVENTOR:

UNITED STATES PATENT OFFICE.

JOHN HENRY KNOWLES, OF PHILADELPHIA, PENNSYLVANIA.

PAPER-FEEDING MACHINE.

SPECIFICATION forming part of Letters Patent No. 544,764, dated August 20, 1895.

Application filed March 9, 1895. Serial No. 541,136. (No model.)

*To all whom it may concern:*

Be it known that I, JOHN HENRY KNOWLES, of the city and county of Philadelphia, State of Pennsylvania, have invented an Improvement in Mechanism for Feeding Sheets of Paper, &c., of which the following is a specification.

My invention relates to mechanism for separately removing sheets of paper, &c., from a pack or pile and delivering them singly to any machine to which it is desired to supply successive sheets.

I have shown my invention embodied in an organized machine designed for separating the sheets from the pack or pile and delivering them in an accurately-registered condition to the machine to be fed; but the mechanism may, if desired, be embodied in and become a part of the machine which acts upon the separately-fed sheets.

I have shown my machine as specially designed for feeding sheets to ruling-machines; but the machine may be employed for feeding other machines, such as printing and other presses, machines for folding, punching, cutting, &c.

My machine embraces improvements in the devices for guiding and directing the pack of sheets in the sheet-holder and means for adjusting the sheet-holder laterally relatively to the sheet-conveying mechanism and to the medial line of the machine which is to receive the sheets.

My invention also embodies improvements in the devices for individualizing sheets from the pack or pile and for withdrawing the sheets when individualized.

My invention also includes a device for registering the sheets while they are upon the carrier, after they have been removed from the pack or pile, and mechanism for accurately spacing the sheets and removing them from the carrier.

In addition to these improvements my invention includes also many other features of construction and combinations of parts, all of which are fully set forth and claimed hereinafter.

I shall now refer to the accompanying drawings for the purpose of more particularly describing my invention.

Figure 1:
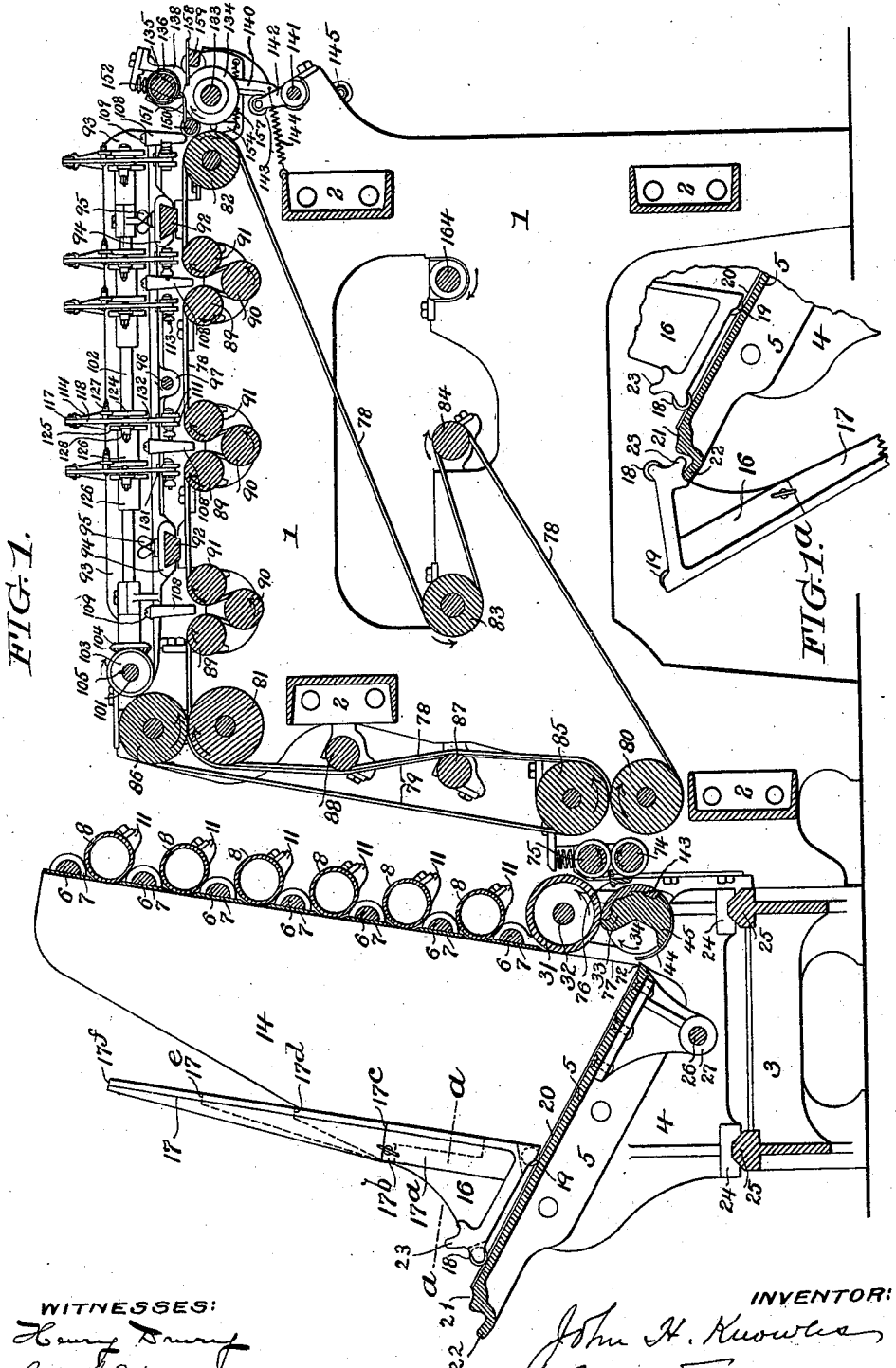
Figure 2:
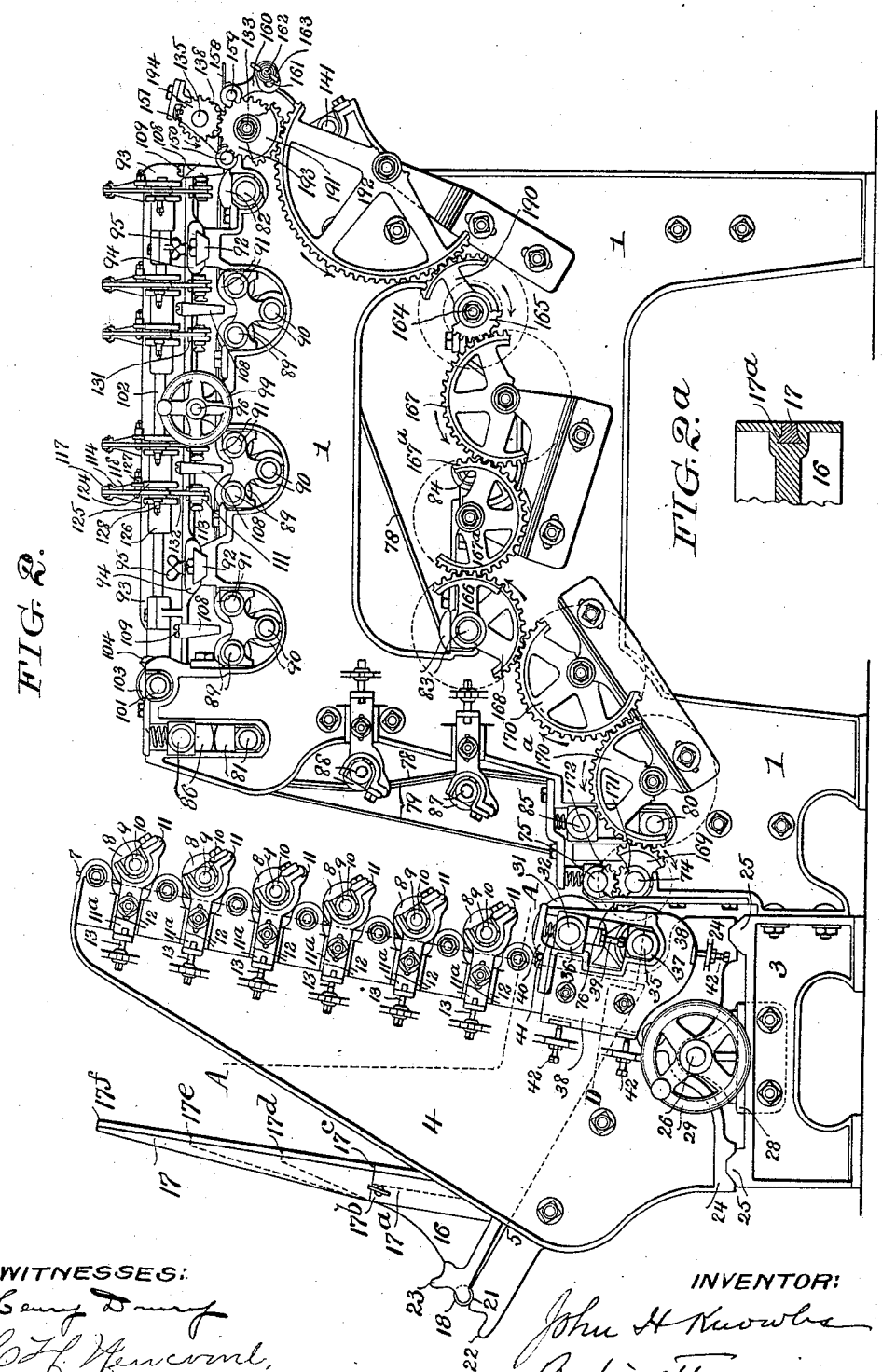
Figure 3:
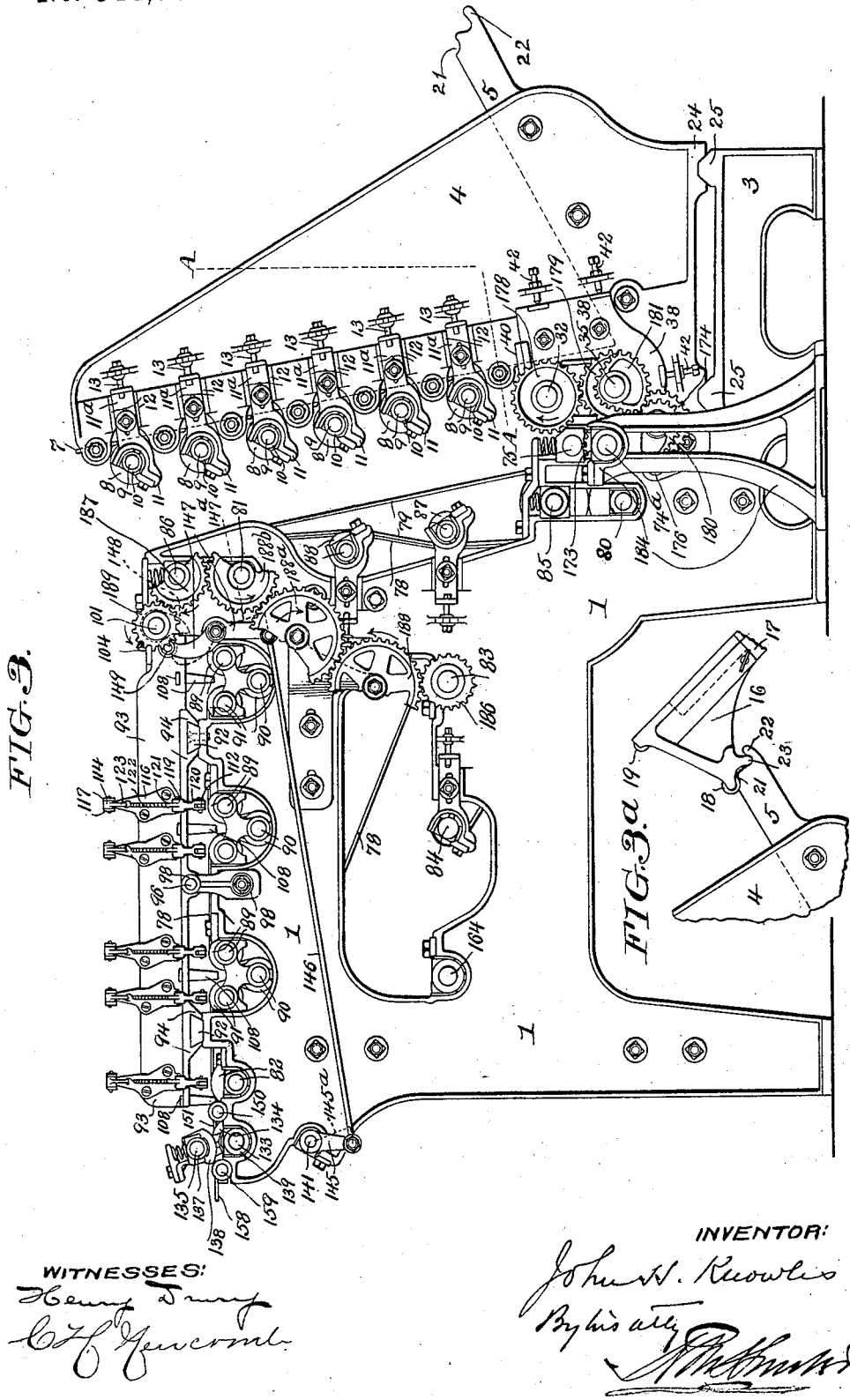
Figure 4:
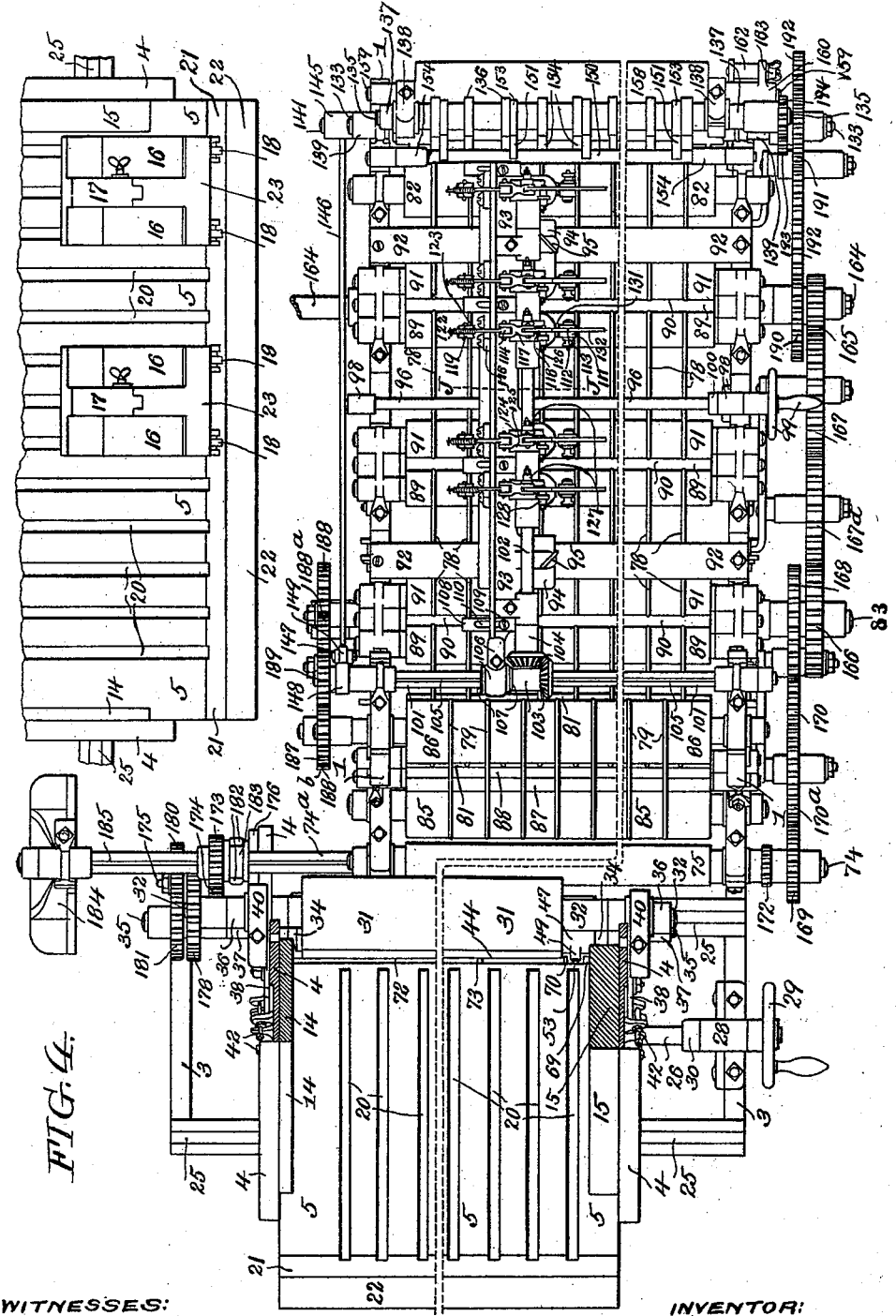
Figure 5:
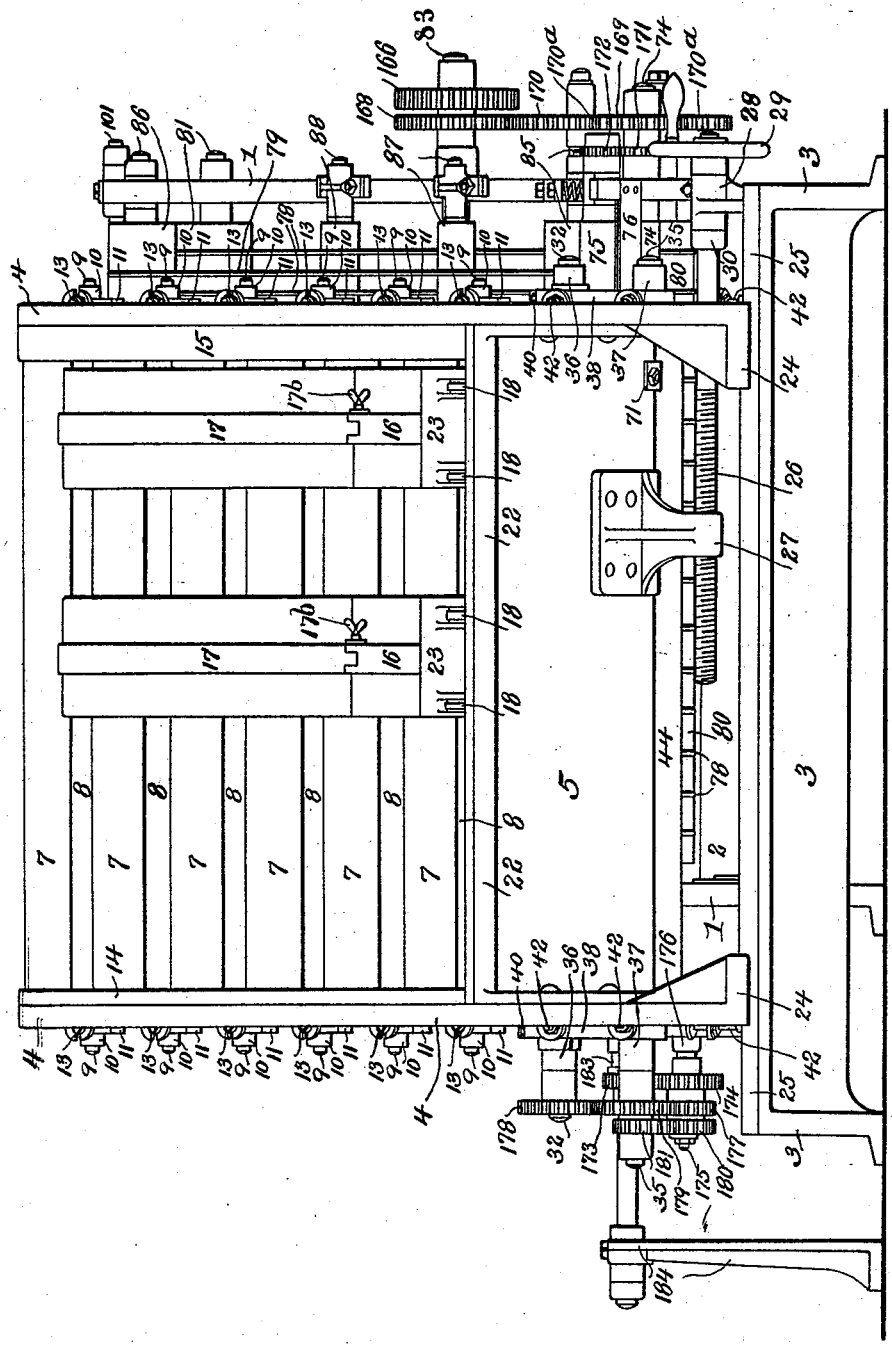
Figure 6:
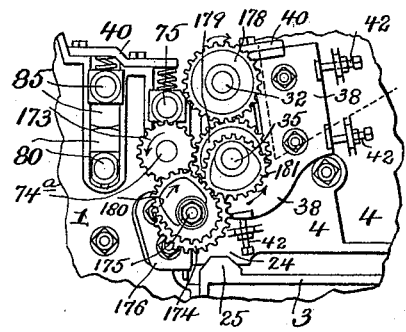
Figure 7:
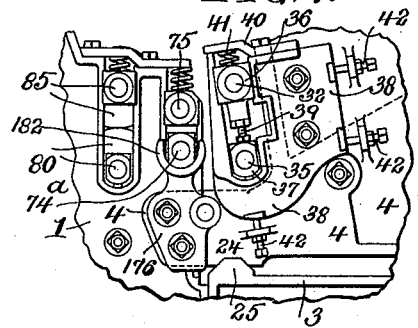
Figure 8:
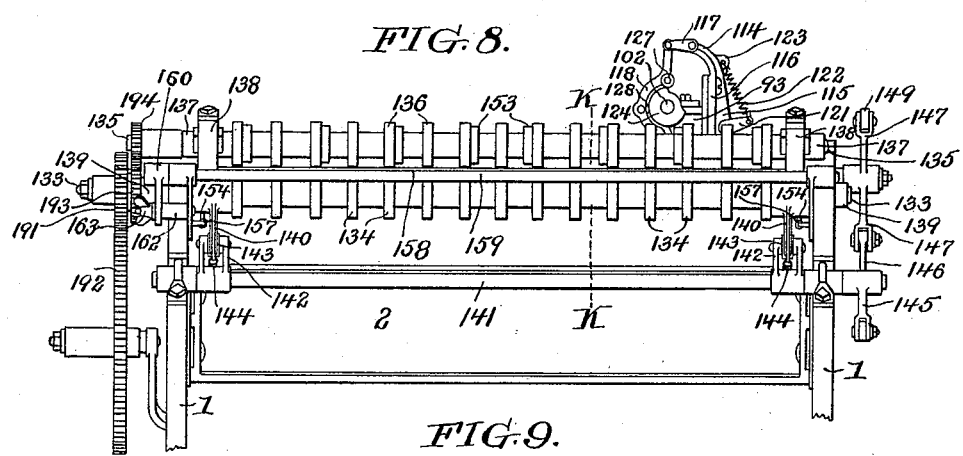
Figure 9:
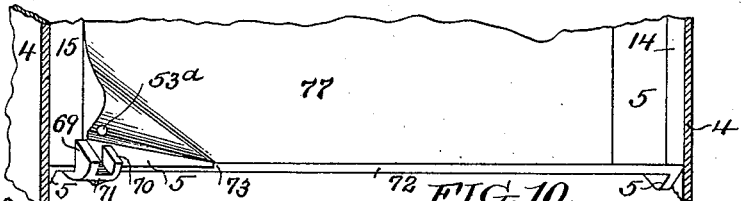
Figure 10:
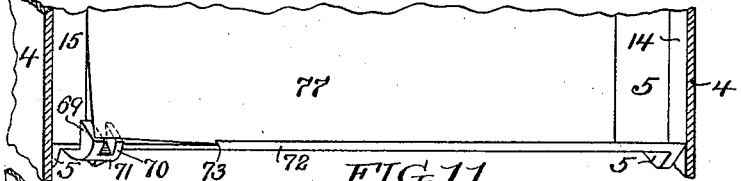
Figure 11:
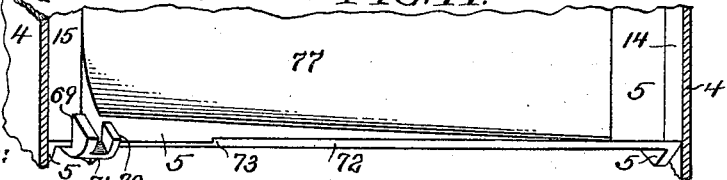

Figure 1 is a longitudinal vertical section of my improved machine for feeding sheets of paper, &c. Fig. $1^a$ is a similar view of the rear portion of the holder, with one of the pressers shown hanging from it. Fig. 2 is a side elevation of the machine. Fig. $2^a$ is a section on the line $a\ a$ of Fig. 1, showing a detail of a presser. Fig. 3 is a view similar to Fig. 2 of the opposite side of the machine. Fig. $3^a$ is a similar view of the rear portion of the holder, showing a presser as it is being turned over the rear edge. Fig. 4 is plan view of the machine, partly in section, on the line A A, Figs. 2 and 3. Fig. $4^a$ is a plan view of the rear portion of the holder, showing the pressers arranged thereon. Fig. 5 is a rear elevation of the machine. Fig. 6 is a fragmentary side elevation with the end stand of the journal $74^a$ removed to show the gearing more clearly than the same is shown in Fig. 3. Fig. 7 is a fragmentary side elevation with gearing removed to show certain parts more clearly than the same are shown in Figs. 3 and 6. Fig. 8 is a front elevation of a portion of the machine. Figs. 9, 10, and 11 are front elevations, slightly in perspective, of the lower portions of the sheet-holder. Figs. 12 to 17 are transverse vertical sections taken on the line B B of Fig. 23, showing the rotating buckling-finger and the rotary separator-blade in different positions. Figs. 18 to 22 are similar views taken on the line C C of Fig. 23, showing parts in still diffferent positions. Fig. 23 is a horizontal section on the line D, Fig. 2, showing the rotating buckling-finger and adjacent parts. Fig. 24 is a view similar to Fig. 23, but showing the rotating buckling-finger in a different position. Figs. 25 and 26 are transverse vertical sections on the line E E, Fig. 23, with the buckling-finger and separator-blade in different positions. Fig. 27 is a view similar to Fig. 25, showing the adjustment of the buckling-pad. Fig. 28 is a section on the line F F, Figs. 24 and 25. Fig. 29 is a plan view of the rotary separator-blade and of the cylinder which carries it. Fig. 30 is a perspective view of the buckling-finger. Fig. 31 shows three transverse sections of the buckling-finger, being taken, $a$ on the line G G, $b$ on the line H H, looking toward the right, and $c$ on the line I I, looking toward the left, all in Fig. 25. Figs. 32 and 33 are views similar to Fig. 25, showing a modification of the rotating buckling-finger. Fig. 34 is a perspective view of the modified buckling-finger shown in Figs. 32 and 33. Figs. 35 and 36 are transverse vertical sections on the line J J, Fig. 4, looking toward the right. Fig. 37 is a perspective view of a detail of the registering device. Figs. 38 and 39 are longitudinal vertical sections on the line K K, Fig. 8, looking toward the right. Fig. 40 is a view, looking in the direction of the arrow L, of certain parts shown in Fig. 38. Fig. 41 is a horizontal section on the line M M of Fig. 38, giving a plan view of certain parts shown in that figure; and Fig. 42 is a longitudinal vertical section of a portion of the machine, showing a modification.

For the purpose of enabling the detailed construction of the machine to be easily understood I shall refer to the different portions separately.

*The frame of the machine.*—1 1 are the side frames of all that portion of the machine which lies forward of the sheet-holder and are connected together by suitable girts or braces 2 2.

3 is the bed-piece which supports the sheet-holder, and may, as shown, be formed with its ends, sides, and cross-ties all in one piece or casting and may be bolted to the side frames 1 1.

4 4 are the sides or ends of the sheet-holder and may be connected and braced by the bottom piece 5 and the transverse brace-rods 6 6.

*The sheet holding and supporting device.*— This device is designed to hold a pack of sheets on edge, preferably in a position inclined slightly forward, and to permit the sheets to be successively withdrawn from the front of the pack. In the drawings I have shown the preferable construction of the sheet-holding devices; but it will be readily understood that the devices may be modified and varied in construction without in any way affecting the other portions of my invention.

The bottom 5 of the holder, on which the edges of the sheets rest, extends entirely across the holder and is secured to the sides 4 4, and it may be inclined, with its low part toward the front.

The front of the holder may consist of any suitable support arranged at the proper inclination to the bottom 5. I prefer, however, to construct the front of the holder of alternately-arranged slats 7 and idler-rollers 8, as described in my Letters Patent No. 531,438, dated December 25, 1894, and No. 535,380, dated March 12, 1895. These slats may be of sheet metal and attached to the brace-rods 6. As an improvement in the construction of a holder of that general character and for the purpose of enabling the rollers 8 to be adjusted in reference to the face of the pack of sheets to vary the pressure of the rollers against the pack and to better adapt their action to sheets of different thickness or character I have shown the bearings 10 for the journals 9 of the rollers 8 carried in adjustable frames or puppets 11, which may be held and guided by lugs 12 12, carried by the sides 4 4, and may be clamped to the sides 4 4 by bolts or otherwise. The puppets 11 and the rollers 8 carried by them may be adjusted by screws 13. These screws may be supported in any convenient manner. I have shown them passing through lugs on the sides 4 4 and also through lugs on the ends of the shanks 11$^a$ of the puppets 11 11.

The sides of the sheet-holder above the bottom 5 may be faced on the inside by facing-pieces 14 15, preferably of wood.

When my improved individualizing device is arranged as I have shown in the drawings, the pack of sheets must be placed in the holder with one edge of the pack against the facing 15, in order to align the sheets for the proper action of the individualizing device. The facing 15 should be of proper thickness to bring the sheets into alignment with the individualizing device, but the thickness of the facing 14 is immaterial. While I prefer to employ the facings of wood, because their thickness may be easily regulated, it is apparent that separate facings may be omitted if the inner faces of the sides 4 4 are extended inward to the required extent.

To hold the pack of sheets in place, with the foremost sheet in contact with the front of the holder, I employ pressers, which act against and press upon the back of the pack. These pressers are required to press the bottom edges of the sheets forward over the bottom of the holder, and the upwardly-extending parts of the pressers prevent any rearward bending of the rearmost sheets of the pack.

Because of the varying lengths of the packs of sheets which from time to time are placed in the holder it is desirable to provide means for varying the height of the pressers. I have therefore constructed each presser in two parts—a lower or base part 16 and an upper part 17, removably secured to the base 16. The part 17 may be secured to the base 16 by a dovetailed joint 17$^a$ and a set-screw 17$^b$, Figs. 1 and 2$^a$. The base 16 is adapted to be used independently of the part 17, and parts 17 of different lengths may be applied to the base 16. Thus by using the base 16 singly or by adding parts 17 of varying lengths the presser may be made to assume different heights—for instance, those indicated by the lines 17$^c$, 17$^d$, 17$^e$, or 17$^f$, Fig. 1. I provide several of these pressers distributed across the bottom of the holder, with provision for lateral adjustment to different positions to suit various widths of sheets. In the drawings two pressers are shown; but one or more may be used, according to the width of the sheets.

When my improved individualizing device is employed to individualize the sheets, one of the pressers should be located close to that side of the holder adjacent to which the individualizing device is arranged, and that portion of the face of this presser which lies opposite the buckling-finger of the individualizing device should be roughened or faced with a frictional material, so as to hold the rearmost sheet of the pack to prevent more than one sheet from being raised at one time by the buckling-finger when but a few sheets remain in the pack.

The base 16 of the presser may be provided with antifriction-rollers adapted to run in grooves formed in the bottom of the holder, acting to guide the pressers as they gravitate forward down the incline of the bottom. I have shown a roller 18 at each rear corner and a roller 19 at each forward corner of the base of a presser. The bottom 5 is provided with a series of grooves 20 more or less numerously placed upon the bottom. The rollers 18 19 run in the grooves 20 and guide the presser and permit it to move easily down the incline, whereby the presser is caused to press against the sheets with greater force than would be the case were the flat base of the presser sliding upon the bottom in the manner in which such pressers have heretofore been employed, or if it be not desired to increase the force with which the pressers act upon the sheets lighter pressers may be used or the inclination of the bottom need not be so great. The pressers may be shifted from one pair of grooves to another pair to attain any desired position across the bottom.

To replenish the pack from time to time, the pressers may be drawn back and additional sheets may be added to the back of the pile. I have provided my holder with means for supporting the pressers out of line with the pack of sheets without completely removing them from the holder while introducing a fresh supply of sheets, or at other times, if required.

The rear edge of the bottom 5 is provided with a depression or gutter 21, and below the gutter the bottom is provided with a rearward extension terminating in an upward inflection or ledge 22, preferably located somewhat below the plane of the surface of the bottom.

23 are projections or hooks, of any suitable construction, on the rear of the presser-bases 16, adapted to engage the ledge 22.

When a presser is to be removed from the holder, it is first drawn up the incline of the bottom 5 until the rollers 18 fall into the gutter 21, as shown in Figs. 2 and 4ª. The presser is then turned rearward on the roller 18 as a fulcrum until the end of the hook 23 has moved over the ledge 22, as shown in Fig. 3ª. The presser is then turned still farther rearward about the end of the hook 23 as a fulcrum until the hook 23 engages the ledge 22 and the follower hangs downward suspended upon the ledge, as shown in Fig. 1ª. The presser is placed in operative position by movements the reverse of those described for removing it. The pressers may be thus suspended in any lateral position which they may chance to occupy, and when so suspended may be moved laterally for purposes of adjustment without being lifted.

When a presser is not required to press upon the back of the pack of sheets, it may be permitted either to rest in the position shown in Figs. 2 and 4ª, when the engagement of the roller 18 in the gutter 21 will prevent the presser from moving down the incline, or it may be suspended from the ledge 22 in the manner described.

The sides 4 of the sheet-holder are provided with guides 24, adapted to rest and slide upon transverse ways 25 on the bed-piece 3. By sliding the holder on the ways 25 it may be adjusted laterally to bring the pack of sheets to any desired position with reference to the medial line of the feeding-machine and the machine which receives sheets therefrom. In order to permit the movement of the sheet-holder, as described, the frame of the sheet-holder and its attached parts and the side frames 1 1 and their attached parts have been so constructed where such framework or parts approach each other that there shall be no interference of such parts when the sheet-holder is moved.

The sheet-holder may be adjusted on the ways 25 by a screw 26, screwing through a boss or nut 27 on the under side of the bottom 5 and having its shank or spindle supported by a bearing 28 on the bed-piece 3. 29 is a hand-wheel or equivalent device fixed on the outer end of the spindle of the screw 26 to operate it. The thrust of the screw 26 is taken against the bearing 28 by the hub of the hand-wheel 29 on one side and by a collar 30 on the spindle of the screw on the other side. When the hand-wheel 29 is turned, the screw 26 acts upon the boss 27 and moves the sheet-holder.

*The sheet-individualizing and sheet-withdrawing mechanism.*—This mechanism consists of a withdrawing-drum, a rotating buckling-finger, a rotary separator-blade combined with an initial sheet-withdrawing cylinder, and a pair of frictional withdrawing-rollers.

31 is the withdrawing drum or cylinder, mounted on a shaft 32 and located in front of the sheet-holder at a proper distance above the bottom piece 5. This drum may be constructed in any suitable manner; but I prefer to construct it with a continuous surface covered with proper frictional material for making frictional contact with the sheets. The drum has a constant rotation in the direction of the arrow in Fig. 1 and is arranged with its surface close to the face of the pack of sheets but without pressing against it. The drum is shortened at the end adjacent to that side of the holder where the sheets are buckled, so as not to interfere with the buckling operation. (See Fig. 4.)

33 is the initial sheet-withdrawing roller or cylinder, located immediately below the cylinder 31 and adjacent to the lower edge of the pack of sheets. The body of the roller 33 may be attached to head-pieces 34, provided with journals 35, and the body part, heads 34, and journals 35 may, if desired, be in one piece. The said body part and the devices carried thereby have a constant rotation in the direction of the arrow in Fig. 1.

The shaft 32 of the withdrawing-drum and the journals 35 of the roller 33 may be supported in any suitable bearings; but I prefer to support them on each side of the machine in bearings 36 and 37, respectively, carried by yoke-pieces 38, adjustably secured to the sides 4 of the holder. The bearings 37 rest in the bottom or closed ends of the yokes, while the bearings 36 are held in the upper or open ends of the yokes, and are sustained by a set-screw 39 on each side of the holder, screwing into a boss formed on one bearing and resting against the other bearing. (See Figs. 2 and 7.) By turning the screws 39 the relative position of the bearings 36 and 37 and of the drum 31 and roller 33 may be adjusted.

40 40 are cap-pieces over the upper parts of the yokes 38. A spring 41 between each cap-piece 40 and the corresponding bearing 36 tends to force the shaft 32 and drum 31 downward toward the roller 33 to secure the proper frictional grip between the drum and roller. The set-screws 39 limit the action of the springs and support the withdrawing-drum 31 at such times as the drum and roller 33 are not in peripheral contact.

By means of set-screws 42 carried by the sides 4 4 of the holder and bearing against the yokes 38 the yokes and the drum 31 and roller 33 carried by them may be adjusted in reference to the face of the pack of sheets without in any wise disturbing the adjustment between the drum and the roller when they are adjusted the one to the other by the means previously described. The yokes 38 may be secured to the sides 4 4 by bolts, as shown, and if the holes through which the bolts pass be made somewhat larger than the bolts sufficient freedom will be permitted for the small amount of movement required in adjusting the yokes.

43 is a frictional pad carried by the roller 33 and extending circumferentially over a portion of its periphery. This pad is preferably formed of rubber and may be fixed to the roller by being embedded in grooves cut therein. The pad 43, which projects beyond the periphery of the other portions of the roller, is of a length substantially equal to the length of the drum 31 and is adapted to make contact with the surface of the drum 31 throughout its entire length. The pad 43, instead of being continuous along the length of the roller 33, may be divided into a series of segments, with alternately unpadded spaces between the segments. The body of the roller 33 opposite the pad 43 is cut away to form a longitudinal recess to receive the lower edge of a sheet during a certain part of each revolution of the roller.

44 is a curved blade carried by the roller 33 and extending forward from the frictional pad 43 over a part of the longitudinal recess in the body of the roller. The blade 44 may be secured to a projecting part 45 of the body-piece of the roller 33, as by rivets 46. (See Fig. 22.) This blade 44, which assists in separating the sheets from the pack and is referred to hereinafter as the "separator-blade," is bent concentrically to the axis of the roller 33 and may be of the same length as and placed opposite to the frictional pad 43. The blade 44 has its edge slanting with respect to the axis of the roller 33, as shown in Fig. 29. The projection of the body-piece upon which the blade 44 is secured may slant in a manner corresponding with the edge of the blade, as indicated by the dotted line 45 in Fig. 29. As may readily be seen by reference to Fig. 29, one end of the slanting edge of the separator-blade is more advanced in the direction in which the cylinder turns than the other end, and this advanced end of the edge of the blade may be conveniently referred to as the "advanced portion," while the other end may be referred to as the "lower portion" of the blade. The blade 44 is arranged with its advanced portion toward that side of the holder adjacent to which the buckling devices are located.

For the purpose of separating the corner of the foremost sheet from other sheets in the pack and placing it in position to be acted upon by the separator-blade 44 I employ a buckling-finger carried by the roller 33 adjacent to the advanced portion of the blade 44. The end of the roller 33 beyond the pad 43 and blade 44 constitutes a "finger-holder" 47, which may be in one piece with the head and body of the roller, as shown. The holder 47 is cut away on one side to form a continuation of the longitudinal recess in the body of the roller 33.

The buckling-finger carried by the roller 33 is arranged in a hole 48, extending transversely through the holder 47. That end of the hole 48 through which the point of the buckling-finger operates is shown substantially in line with the rear edge of the frictional pad 43, so that the rear edge of the pad may pass away from the front of the sheet immediately after the buckling-finger has operated to buckle a corner of a sheet to permit the sheet to straighten out, as indicated in Fig. 16. The surface of the finger-holder 47 about the hole 48 may be raised to form bosses 49 50, so as to increase the length of the hole.

51 is a slot or groove through one side of the finger-holder, communicating with the hole 48. (See Figs. 23 and 28.)

I will now describe the buckling-finger and adjacent parts, referring more particularly to Figs. 23 to 34, inclusive.

52 is the body of the buckling-finger, passing through the hole 48 and freely sliding therein. In one end of the body 52, which is of tubular form, is fitted a frictional pad 53, the outer end of which is adapted to act upon the surface of the sheets in the pack. The tube 52 and pad 53 are most conveniently constructed with a circular cross-section, as shown in Fig. 31, section $a$. The pad 53 may be a small rubber block screwed into the tube 52 and may be secured by a threaded plug 54, screwed into the tube 52 and provided with a teat 55, (shown triangular in cross-section in Fig. 31, section $b$,) engaging the end of the pad or block. The teat 55 enters the pad and prevents it from turning in the tube unless the plug turns also, and the pressure between the pad and the plug binds their respective threads against the threads in the tube 52 and effectually prevents the accidental turning or displacement of the pad. The pad 53 may be adjusted when it becomes worn, or at other times, by a key-wrench 57, (see Fig. 27,) passed through the tube 52 and engaging a socket 56 (shown as a square depression in Fig. 31, section $c$) in the rear of the plug 54. By turning the key-wrench the plug 54 may be turned, and because the angular teat 55 engages the end of the pad 53 the pad will be turned also, and thereby adjusted in its threaded socket.

58 is a shank connected to the body 52 of the buckling-finger at a right angle thereto and extending through the slot 51, in which it may move freely. The shank 58 may be joined to the body 52, as shown in Figs. 28 and 30, by a cylindrical enlargement 59 on its end, received into the tubular body, with the spindle of the shank passing through a slot cut in one side of the tube. The tube and shank may then be soldered or brazed together. A hole 60 should be formed through the enlargement 59 to admit the key-wrench 57.

61 is a spring inside of the tube 52, adapted to press the tube and its pad 53 outward. The spring 61 is constructed so as not to interfere with the wrench 57 when the latter is inserted through the tube to adjust the pad 53, as shown in Fig. 27.

62 is a pin adapted to pass with a driving fit into a hole 63 in the finger-holder 47, near the boss 50, at right angles to the hole 48. When the pin 62 is driven into the hole 63, it passes through slots 64, formed in the sides of the tube 52 adjacent to the shank 58, and through the tube 52, behind the spring 61, as shown in Figs. 25 and 28. The pin may be provided with a beveled point 65, so as to push aside the spring 61 as the pin is driven forward. The pin 62 thus acts as a fixed bearing for the spring 61 and causes it to project the finger 52 and its pad 53 outward through the boss 49 and also to draw the shank 58 toward the bottom of the slot 51. The slots 64 permit the finger 52 to move while the pin 62 is in place. When the pin 62 is withdrawn, the spring 61 will bear against the enlargement 59 of the shank 58 and will not operate to move the finger 52. (See Fig. 27.) When the parts are in the position shown in Fig. 27, the key-wrench 57 may be inserted through the tube 52 to adjust the pad 53.

66 is a cam mounted concentrically with the axis of the cylinder 33 and has a depression 67 for operating the buckling-finger 52 through the angular shank 58. The cam 66 is held stationary, as related, to the rotation of the cylinder 33, and it may be mounted, as shown, upon the bearing 37 of the cylinder 33. (See Fig. 23.) The outer end of the shank 58 projects through the slot 51 and makes contact with the cam 66, and it may be provided with an antifriction-roller 68 to engage the cam. When the cylinder 33 rotates, the shank 58 and its roller 68 revolve about the stationary cam 66, and the roller 68 is at all times pressed or drawn against the cam by the action of the spring 61, and the cam and spring will reciprocate the finger in the hole 48, so as to project and retract the padded end 53.

69 and 70 are guards or lips which overlie the face of the pack of sheets at the lower corner of the holder adjacent to that side of the holder where the sheets are operated upon by the buckling-finger. These lips may be attached to a common base-piece 71, bolted to the under side of the bottom 5, as shown. These lips serve to retain the corner of the pack in position when the pack is pressed forward by the pressers and also serve, by virtue of the friction between them and the pack, to hold the corner of the sheets against the action of the buckling-finger to insure the separation of but a single sheet from the pack by the finger. I have shown the two lips 69 and 70 with a space between them, through which the buckling-finger passes, and this is the preferable arrangement of the lips; but, if preferred, only one lip may be employed, and it may be placed on either side of the buckling-finger. When two lips are used, the inner lip 70 is preferably made lower and somewhat narrower than the outer lip 69.

72 is a lip or edge turned up along the lower forward edge of the bottom 5, and serves to retain the lower edge of the sheets in the pack from falling outward. The lip 72 is shorter than the edge of the bottom and terminates at a point, as at 73 in Figs. 9, 10, and 11, at some distance from that corner of the holder at which the buckling devices are arranged.

In Figs. 32, 33, and 34 I have shown a modification of the buckling-finger in which the tubular body of the finger is formed of two tubular pieces 52 and 52$^a$, within the former of which the pad 53 and plug 54 are arranged, as in the construction previously described. The tube 52$^a$ is of less diameter than the tube 52, into the end of which it is fixed. If preferred, the tubes 52 and 52$^a$ may be constructed of one piece of metal. The cylindrical enlargement 59 on the end of the shank 58 passes around the end of the tube 52$^a$ and is secured thereto. The coil-spring 61 surrounds the smaller tube 52$^a$ within the hole 48 and bears at one end against the end of the tube 52 and at the other end against the end or shoulder of a thimble 62ª, which surrounds the enlargement 59 of the shank 58. The spindle of the shank passes through a slot 62ᵇ in one side of the thimble 62ª, and the thimble 62ª is fixed in the boss 50 of the finger-holder 47 and may be secured by screws 62ᶜ. The tube 52ª and shank 58 are free to move in the thimble 62ª and its slot 62ᵇ. The operation of the spring 61 and the movements of the pad 53 and other parts of the buckling-finger are the same as the operation and movements of the similar parts in the construction shown in Figs. 25 and 30. In the modified construction the key-wrench 57 can be inserted through the tube 52ª without the inconvenience of first removing the pin 62, which in this construction is not required.

74 and 75 are a pair of rollers located immediately in front of the initial withdrawing-roller 33 and the withdrawing-drum 31 and are adapted to receive the sheets as they pass from between the said roller and drum. The rollers 74 75 turn in the direction indicated by arrows in Figs. 1 and 22 and are supported by bearings, preferably spring-pressed, carried by the side frames 1.

76 is a stationary guide plate or strip carried by the side frames 1 1 and located between the roller 33 and roller 74. The guide-plate 76 supports and guides the edges of the sheets as they pass to the rolls 74 75.

77 is that sheet of the pack which lies against the front of the holder.

I will now explain the operation of the parts described in individualizing and withdrawing the sheets. A pack of sheets is placed in the holder with the edges of the sheets on one side against the facing-piece 15, or against that side of the holder adjacent to which the buckling-finger is located. The pressers are placed behind the pack and the idler-rollers 8 are adjusted to bear properly upon the face of the pack. The withdrawing-drum 31 and the initial withdrawing-roller 33 are adjusted to the proper distance apart, and by means of the yokes 38 are adjusted at the proper distance from the face of the pack. Supposing the buckling-finger and separator-blade to be turned away from the pack—for instance, into the position shown in Fig. 12—the process of withdrawing sheets from the pack may be commenced. When the parts are in the position shown in Fig. 12, the roller 68 bears against a high part of the cam 66 and the frictional pad of the buckling-finger is retracted wholly within the finger-holder 47 out of contact with the foremost sheet 77. As the roller 33 rotates into the position shown in Fig. 13 the roller 68 begins to enter the depression 67 of the cam 66 and the buckling-finger 52 is projected outward by the action of the spring 61. The pad 53 is shown in Fig. 13 close to, but has not yet engaged, the sheet 77. As the roller 33 rotates into the position shown in Fig. 14 the roller 68 enters still farther into the depression 67 of the cam 66 and the buckling-finger is projected still farther outward from the finger-holder until the pad 53 engages the surface of the foremost sheet in the pack near one corner and commences to draw that corner of the sheet upward behind the guards 69 and 70. The corner of the outermost sheet is shown in Fig. 14 drawn up behind the guards and slightly bent or buckled, as at 77ª. When in this position, the roller 68 does not go down to the bottom of the depression 67, because the pad 53 rests against the pack, and hence the full force of the spring 61 is being exerted to press the finger against the pack and the pad is free to accommodate itself to any inequalities which may occur in the position of the surface sheets of the pack opposite the pad. The depression 67 may be cut low to permit this action. As the roller 33 rotates into the position shown in Fig. 15 the roller 68 passes across the cam depression 67 and the buckling-finger remains projected with its pad in contact with the sheet, and as the pad moves over the face of the pack it fully draws the corner of the foremost sheet from behind the guards 69 and 70. The corner of the sheet 77ª is shown in Fig. 15 fully drawn up from behind the guards, and the curved dotted line in this figure indicates the buckled position occupied by the corner of the sheet at this instant. In Fig. 9 is shown substantially the shape of the buckle produced by this action. The apex of the buckle will be at or about at the point 73 where the edge lip 72 terminates, because the slight effect produced on the edge of the sheet by the buckling-action at the distance of the point 73 from the buckling-finger is overcome by the small resistance offered against the movement of the edge of the sheet by the lip 72. In Fig. 9 the small circle 53ª indicates the place where the end of the pad 53 of the buckling-finger makes contact with the sheet. The upward limit of the buckle will be determined by the face of the sheet resting lightly against the end of the drum 31, and as the end of the drum is somewhat removed from the side of the holder (see Fig. 4) the side edge of the sheet may rise to a position somewhat above the surface outline of the drum, as shown by dotted lines in Fig. 15. At this moment the roller 68 has just touched the rise of the cam 66. As the roller 33 rotates into the position shown in Fig. 16, the roller 68 rises to the high part of the cam 66 and the buckling-finger is retracted into the finger-holder 47, withdrawing the pad 53 from contact with the sheet. As the corner of the sheet is now relieved from the action of the pad 53 and the longitudinal recess in the side of the roller 33 having now reached a position adjacent to the sheet-holder, there is nothing to maintain the buckled position of the corner of the sheet, and it straightens out by reason of its natural elasticity into the position shown in Fig. 16. As the corner of the sheet straightens out, it cannot again pass behind the guards 69 and 70, because the subjacent sheets of the pack have moved forward and press against the guards. Hence the lower edge of the corner of the sheet passes outside of the guards, which may be beveled, as shown, to guide the edge of the corner outward. In Fig. 10 the sheet is shown in the position which it occupies at this moment, with its lower edge bent outward from the lip 72 at the point 73 to the guards 69 and 70. As there is no lip 72 from the point 73 to the guard 70, the corner of the sheet can readily assume the position shown in this figure. As the roller 33 rotates into the position shown in Fig. 17, the roller 68 continues upon the high part of the cam 66, and thereafter remains upon the high part of the cam until the roller comes again into the position shown in Fig. 12. The corner 77$^a$ of the sheet remains in its straightened-out position and the advanced portion of the blade 44 enters behind it. When the corner of the sheet is in the position shown in Figs. 17, 16, and 10, being held in an outwardly-bent position by the guards 69 70, there will be a triangular space or opening intervening between the face of the pack and the outwardly-bent corner of the sheet, into which the advanced portion of the blade 44 enters. The adjustment of the roller 33 relatively to the face of the pack, the height of the guards 69 and 70, and the location of the end of the blade 44 relatively to the guard 70 are all such that the corner of the blade may readily pass behind the edge of the sheet. (See Figs. 4, 23, and 24.) As the roller 33 rotates into the position shown in Fig. 18, the advanced portion of the blade 44 passes still farther behind the sheet 77$^a$ without bending it. In Fig. 18 the point of the advanced corner of the blade 44 is shown just touching the inner face of the sheet. As the roller 33 rotates into the position shown in Fig. 19, the edge of the sheet is bent outward by the blade 44. As the slanting edge of the blade 44 advances, it passes gradually behind the sheet 77$^a$, crowding the edge of the sheet forward over the lip 72, and as the blade has a cylindrical curvature every point along its slanting edge will pass equally close to the edge of the sheet, but as the more advanced portions of the blade act on the sheet before the lower portions the sheet will at first be bent out to a greater extent on one side than on the other. In Fig. 19 that corner of the sheet acted on by the advanced portion of the blade is shown bent outward to the position indicated by the dotted line 77$^a$, while the opposite corner of the sheet has been but slightly removed from the pack to the position indicated by the dotted line 77$^b$. The curved dotted line connecting the lines 77$^a$ and 77$^b$ represents the position of the lower edge of the sheet when the sheet when is bent as described. Fig. 11 shows the sheet when partly bent outward from the pack, as in Fig. 19. When the roller 33 has reached the position shown in Fig. 20, the blade 44 has acted equally throughout its length, and the entire edge of the sheet is bent to an equal extent about the drum 31. As the surface of the blade does not act to press the sheet against the surface of the drum 31, there is no tendency of the portion of the sheet first bent outward to be operated on by the drum 31 before the entire edge of the sheet has been fully bent out. In Fig. 20 the low corner of the blade is shown advanced to the point 44$^a$. As the edge of the sheet is bent outward from the position shown in Fig. 17 to the position shown in Fig. 20, the edge of the sheet passes through the recessed portion of the roller 33. As the roller 33 rotates into the position shown in Fig. 21, the forward edge of the pad 43 advances and reaches the surface of the drum 31, with the sheet between the frictional pad and the drum. The position shown in Fig. 21 is very nearly the same as that shown in Fig. 13, and the buckling-finger is in position to commence the operation of individualizing another sheet from the pack. As the roller 33 rotates into the position shown in Fig. 22, the frictional pad 43 operates upon the sheet 77$^a$ by pressing it against the drum 31, and thereby causes the sheet to be partially withdrawn from the pack, so that its forward edge passes between the rollers 74 75. The withdrawing-drum 31, the frictional pad 43 of the roller 33, and the rollers 74 75 are driven with equal peripheral or surface speeds to insure the proper action of these parts in withdrawing the sheets. The position shown in Fig. 22 is the same as that shown in Fig. 17, and during the movements of the roller 33 from the position shown in Fig. 21 to that shown in Fig. 22 it assumes successively the positions shown in Figs. 13, 14, 15, and 16, and a second sheet is individualized from the pack by the action of the buckling-finger in the manner previously described. In Fig. 22 the dotted line 77$^c$ represents the second individualized sheet. As the roller 33 rotates from the position shown in Fig. 22, the sheet 77$^a$ is completely withdrawn from the pack. If the sheet be very short, the rollers 74 75 may completely withdraw it before the pad 43 again comes in contact with the drum; but if the sheet be longer the pad 43 may operate again upon the sheet by pressing it against the drum 31, and while the sheet is so pressed by the pad 43 the sheet will be withdrawn conjointly by the rollers 74 75 and the pad 43 and drum 31. If the sheet be very long, the pad 43 may thus operate several times in succession upon the same sheet. The special purpose of the rollers 74 75 is to make the withdrawal of the sheet continuous by drawing on the sheet when the pad 43 is turned away from the drum 31. When the roller 33, after leaving the position shown in Fig. 22, again returns to the position shown in Fig. 21, having assumed successively the positions shown in Figs. 18, 19, and 20, its separator-blade 44 will have acted on the sheet 77$^c$ and have bent its edge wholly from the pack and passed it about the drum 31 in position to be acted upon by the pad 43 and to be withdrawn from the pack.

By the continued operation of the mechanism described a series of sheets will be successively individualized and withdrawn from the pack.

By the action described one sheet is separated from the pack with each revolution of the roller 33, and the withdrawal of each sheet may be commenced before the sheet previously operated upon has been completely withdrawn. When this is done, the forward edge of each succeeding sheet is bent under the preceding sheet which yet lies upon the withdrawing-drum, and the two sheets are thereafter drawn simultaneously from the pack. If the sheets are very long, more than two sheets may thus be in process of withdrawal at one time.

When the drum 31, roller 33, and rollers 74 75 have a constant and uniform surface speed, each sheet will be withdrawn a distance equal to the circumference of the roller 33, measured on the complete circle described by the pad 43, before the removal of another sheet will be commenced. In order to diminish the distance by which one sheet will be withdrawn before the withdrawal of another sheet is commenced, and also to increase the rapidity with which sheets will be removed from the pack without increasing the speed at which the sheets are moved forward by the drum 31 and rollers 74 75, the roller 33, by means to be hereinafter described, may be caused to move with a variable speed of rotation in the following manner: When the pad 43 is in contact with the drum 31, the roller 33 may be rotated with a speed to cause the surface of the pad 43 to move with the same speed as the surface of the drum 31, but throughout that portion of each revolution of the roller 33, when the pad 43 is not in contact with the drum, the speed of the roller may be accelerated, so that the pad 43 will be brought again into a position to make contact with the drum 31 quicker than if the speed of the roller 33 were uniform. In the particular construction shown in the drawings the pad 43 has a circumferential breadth equal to one-third of the circumference of the complete circle described by its surface, and consequently it is in contact with the drum 31 during one-third of a revolution of the roller 33. By accelerating the speed of the roller 33 during the two-thirds of its revolution, when the pad 43 is out of contact with the drum 31 to such an extent that it will move through that distance in the same length of time that it takes to rotate the remaining third of its revolution the pad 43 may be caused to make successive contacts with the drum 31 at intervals requiring but two-thirds of the time that would be required if the speed of the roller 33 were uniform. By varying the speed of the roller 33 in this manner the extent to which one sheet will be withdrawn before the withdrawal of the next sheet is commenced will be but two-thirds as great as it would be were the roller 33 driven with a uniform speed of rotation, and the sheets will be withdrawn with a rapidity one-half greater—that is to say, three sheets will be withdrawn where two sheets would be withdrawn by the uniform speed of rotation.

As will be seen by reference to Figs. 13 to 21, the pad 43 is in contact with the drum 31 while the buckling-finger is operating upon the sheets and while the advanced portion of the separator-blade is entering behind the sheet, and is out of contact with the drum while the blade is bending the sheet. Consequently, when the speed of the roller 33 is varied in the manner described, it will move slowly when the comparatively delicate operation of buckling the sheet is being performed and will move rapidly when the comparatively simple operation of bending the sheet is taking place.

While I prefer to use the rollers 74 75 to cause the continuous movement of the sheets from the pack, these rollers are not essential for the withdrawal of sheets. If they are omitted, each sheet will be withdrawn to an extent equal to the width of the pad 43 with each revolution of the roller 33, and during the interval that the pad 43 is out of contact with the drum 31 the partially-withdrawn sheet will lie loosely under the drum supported by the guide-plate 76, or equivalent device, without being farther withdrawn from the pack until the pad 43 again comes in contact with the sheet. Thus by successive actions between the pad 43 and the withdrawing-drum the sheet may be completely withdrawn from the pack without the aid of the rollers 74 75. When the rollers 74 75 are omitted, the sheet-carrier is arranged to receive the sheets directly from the drum 31 and roller 33, as shown in Fig. 42.

*The sheet carrier or conveyer.*—The devices for receiving the sheets from the withdrawing mechanism and conveying them therefrom may be of any ordinary construction, but I prefer to arrange the carrier as I have shown in the drawings. Sheets must usually be supplied to such machines as are to receive them at an elevation of several feet from the floor. If a holder which supports the sheets in a more or less upright position and delivers them from the bottom of the holder were arranged with its delivery-point at the same elevation as the in-taking line of the machine to be fed, it would be raised to such an excessive elevation that it would be inconvenient to reach for the purpose of supplying sheets when the sheets to be fed were of any considerable length. To obviate this difficulty I have found it convenient to arrange the holder with its bottom or delivery-point near the floor and at a distance below the plane over which the sheets are to be delivered to the machine which is to receive them and to carry the sheets delivered from the holder up to said plane where they may be registered, spaced out, and delivered to the machine to be fed. The machine thus constructed is more solid and symmetrical, and sheets are supplied to the holder with ease and convenience. In describing my carrying device I shall refer more particularly to Figs. 1, 2, 3, 4, and 5.

The carrier which I have shown consists of traveling aprons 78 79, each formed of a continuous web or blanket, or of tapes or cords.

80, 81, 82, 83, and 84 are rollers which support the apron 78 of the main carrier, and 85 and 86 are rollers which support the apron 79 of the supplementary carrier.

87 and 88 are binding-rollers. The roller 84 is also a binding-roller.

The top stretch of the apron of the main carrier between the rollers 81 and 82 may be a straight line, but when a registering side gage is employed, such as I have shown, the surface of this portion of the apron is depressed at intervals by rollers 89, 90, and 91, about which it passes to produce pockets or spaces to receive the fingers of the side gage of the registering device.

All of the rollers about which the aprons of the carrier pass turn in the direction indicated by the arrows, and they may be provided with journals and supported in bearings carried by the side frames 1 1.

The roller 85 is arranged above the roller 80, and these two rollers run together as a pair and are located immediately forward of the rollers 74 75 of the withdrawing device in a position to receive the sheets as they issue from between the rollers 74 75. The roller 86 is arranged above the roller 81, and these two rollers, which run together as a pair, are located at the rear end of the horizontal surface of the carrier. The rollers 87 and 88 are located between the two pairs of rollers 80 85 and 81 86. The roller 82 is located at the forward end of the horizontal surface of the carrier and the rollers 83 84 are located between the rollers 80 and 82.

The apron 78 passes around the rollers 80, 81, and 82. In its passage from the roller 80 to the roller 81 it is bent about the roller 85 and makes contact with the two binding-rollers 87 and 88. In its passage from the roller 82 back to the roller 80 it makes a bend about the rollers 83 and 84. The apron 79 of the supplementary carrier passes about the rollers 85 and 86, and in its passage from the roller 85 to the roller 86 it makes contact with the rollers 87 and 88, and it bends about a portion of the surface of the roller 81.

The bearings of each of the two pairs of rollers 80 85 and 81 86 are spring-pressed in the usual manner to secure a proper yielding pressure between the rollers of each pair, and the bearings of the binding-rollers 87, 88, and 84 are horizontally adjustable, the adjustments being preferably made in the same manner as with the idler-rollers 8, previously described. When their respective bearings are adjusted, the rollers 87, 88, and 84 are adjusted horizontally.

In the drawings I have shown the rollers 83 and 86 power driven, and the other rollers are driven from the rollers 83 86 by the friction of the aprons passing about them. Power is applied to the rollers 83 86 in preference to any of the other rollers, because the slack of the aprons will be thrown by these rollers into portions of the aprons which do not touch the sheets, and those parts of the aprons which are in contact with the sheets will be kept under uniform tension. By adjusting the roller 84 the slack of the apron 78 may be taken up and its tension regulated. The adjustment of the rollers 87 88 also serves to some extent to regulate the tension of the aprons.

The sheets passing from the withdrawing device are received between the rollers 80 85, and thence pass upward between the aprons 78 79 to and about the roller 81, thence along the horizontal surface of the carrier to the delivery-rollers of the feeding-machine. The spaces between the rollers 89 and 91 will in nowise interfere with the passage of the sheets upon the horizontal surface of the carrier, as the sheets pass readily over these spaces.

Owing to the manner in which the aprons 78 and 79 are brought together in passing about the rollers 80 85 and 81 86, their surfaces move together in substantially the same upward planes, so that the sheets which are between them are held tightly without liability of being displaced. The binding-rollers 87 88, by deflecting the aprons somewhat from a straight line, cause them to bind the sheets still more closely.

When the aprons 78 79 are formed of cords, I prefer to have the cords of one apron intersect the spaces between the cords of the other apron, as shown in Figs. 4 and 5.

*The sheet-registering mechanism.*—Should any of the sheets be out of proper alignment when they are received upon the carrier, it is necessary to restore them to their proper position before they are further operated upon. The mechanism which I employ for this purpose consists, in conjunction with the carrier, of front stops to temporarily stop the sheets to permit them to be registered, a side gage, and devices for moving the sheets laterally against the side gage. In describing this part of my invention I shall refer more particularly to Figs. 1, 2, 3, 4, 35, 36, and 37.

As the withdrawing mechanism may operate to commence the withdrawal of a second sheet before the previous one has been fully withdrawn and place the edge of the second sheet under the previous sheet, it is apparent that when the sheets reach the carrier they may lie in a series with the foremost sheet on top and with the forward edge of each sheet more or less in advance of the forward edge of the next following sheet.

For the proper operation of my registering device it is necessary that the horizontal part of the carrier should be of sufficient length to permit the longest sheet which is to be fed by the machine to lie free upon it. The front stops used for stopping the sheets while being operated upon by the side registering devices may be of any proper construction and may be operated in any convenient manner. The stops marked 152, which I prefer to employ, are a part of the final spacing-out and separating devices, and will be particularly described when I describe those devices. These stops reciprocate and, at one period of their reciprocation, pass across the pathway of the sheets, so that each sheet is temporarily arrested in its forward movement. During the temporary stop of each sheet the side registering of the sheet is accomplished, after which the front stops move out of the way and the sheet passes forward. While the top sheet is held by the stops the underlying sheets may continue their forward movements, sliding under the arrested sheet. The distance between the forward edges of successive sheets, as related to the surface speed of the carrier, is such that after the top sheet is arrested and before the next underlying sheet can reach the front stop sufficient time will elapse to permit the upper sheet to be registered or moved into proper alignment to allow the front stops to move away and permit the forward edge of the registered sheet to pass and for the stops to return to intercept the next sheet.

The devices which I employ to move the sheets into proper alignment consist of a series of frictional pads, which operate upon the surface of a sheet near one edge and draw the sheet laterally against a side gage. The side gage consists of a series of adjustable gage-fingers. The gage-fingers and the frictional pads and their operating mechanism are mounted on a bar or frame, which is adjustable transversely across the machine to adapt the registering device to sheets of different widths or in different positions. By this means the registering devices may be adjusted without altering the relative adjustment of the frictional pads and gage-fingers.

92 92 are cross-bars carried by the side frames 1 1 and extend transversely across the machine a short distance above the horizontal portion of the sheet-carrier. These bars may be beveled in cross-section, as shown, and while I have shown two bars there may more than two, if desired.

93 is a longitudinally-arranged frame mounted on the cross-bars 92 and movable thereon. The frame 93 may be formed of a single bar or piece, angle-shaped in cross-section, as shown in Figs. 35 and 36, and it may be provided with shoe-pieces 94, adapted to grasp the beveled cross-bars 92 and to slide thereon. When thus arranged, the side faces of the frame 93 will always lie in a position parallel to the direction in which the sheets move in whatever position the frame may be adjusted. The frame may be secured to the cross-bars 92 by set-screws 95.

In order to adjust the frame 93 more accurately and easily than the same can be done by hand, I provide the adjusting-screw 96, threaded through a boss 97 on the frame 93 and supported by standard-bearings 98, carried by the side frames 1 1. The screw may be operated by a hand-wheel 99 on the end of its spindle or shank. The hub of the hand-wheel may take the thrust of the screw on one side of a bearing, while a collar 100 may receive the thrust on the other side.

101 is a shaft parallel to the cross-bars 92, extending across the machine over the carrier and supported in bearings carried by the side frames 1 1.

102 is a horizontal shaft supported in a position parallel to the side faces of the frame 93 by bearings thereon.

103 is a bevel-gear mounted on the shaft 101 by a spline or key 105, so as to move longitudinally on the shaft while rotating with it.

104 is a bevel-gear fixed on an end of the shaft 102 and engaging the gear 103.

106 is a bearing carried by the frame 93 and encircling the hub of the gear 103 between shoulders 107 thereon. (See Fig. 4.) When the frame 93 is moved on the cross-bars 92, the gear 103 is moved on the shaft 101 through the medium of the bearing 106. The bearing 106 also serves to keep the gears 103 and 104 in proper working mesh, so that the shaft 102 may be driven from the shaft 101 in whatever position the frame 93 may be adjusted.

108 are the gage-fingers carried by the frame 93, preferably by a horizontally-adjustable connection, such as the slot 110 and screws 109. (See Fig. 4.) I have shown four of these fingers, but that number is not essential. The fingers may pass through openings through the vertical side of the angle-shaped frame 93, and may bend downward at their inner ends. In Figs. 35 and 36 the full lines 108 show the gage-fingers adjusted closest to the frame 93 and the dotted lines 108ª show them adjusted farthest from the frame. By adjusting the gage-fingers 108 the distance from the pads of the registering device to the side edge of the sheet may be varied. Those gage-fingers against which the edges of the sheets are to be moved are adjusted in a line parallel to the course of the carrier, while those fingers which are not required may be moved nearer to the frame 93. The extremities of the gage-fingers extend below the surface of the carrier, so that the edge of a sheet cannot be drawn under them. The transverse adjustment of the gage-fingers across the machine with the frame 93 is not impeded by the carrier, because the latter is wound about the rollers 89, 90, and 91 to form transverse pockets or depressions in which the fingers may move. The fingers shown in Figs. 1, 2, and 3 at the forward end of the frame, being beyond the end of the carrier, are obviously not obstructed.

111 are the registering-pads, which operate upon the surface of the sheets to draw them laterally against the gage-fingers. These pads are carried by the finger-bars 112 and may be secured by clamping-bolts 113. There may be two pads on each finger-bar, one on each side, as shown. Normally the pads remain suspended over the side edges of the sheets a short distance from the gage-fingers 108. The finger-bars 112 are moved to cause the pads to descend upon a sheet, to move laterally to draw the sheet against the gage-fingers, then to rise from the sheet and return to their normal positions and remain at rest until they are again operated.

In Figs. 35 and 36 the heavy line 77$^d$ represents a sheet of paper lying upon the carrier. In Fig. 35 the sheet is shown at a distance from the gage-finger 108, which may be its position before it has been acted upon by the registering-pads; and in Fig. 36 the sheet is shown after it has been operated upon by the pads advanced in contact with the gage-fingers.

I have shown five registering-fingers with their attached pads located over the rollers 82, 89, and 91, which support the apron of the carrier. The solid bodies of the rollers support the sheets against the thrust of the registering-pads. If preferred, the pads may be arranged over the spaces between adjacent rollers 82 91 and 89 91 upon flat-surfaced supports placed under the apron of the carrier in the manner well known in this art. Each bar 112 is operated independently of the others, and I will describe the construction and operation of the mechanism which operates one bar 112, and it will be understood that the mechanism which operates each other bar 112 is similar.

114 and 115 are upper and lower ear-pieces carried by the frame 93 and may be formed integrally with a bracket 116, fastened to the frame 93. To the upper ear-piece 114 is pivoted a link 117, to the outer end of which is pivoted a curved lever 118, pivoted at its lower end to the finger-bar 112. The position of the finger-bar 112 and of the link 117 is such that the shaft 102 may pass between them.

119 is a bell-crank lever pivoted to the ear-piece 115 and having its depending arm 120 pivotally connected with the rear end of the bar 112, which occupies an approximately-horizontal position under the frame 93 and above the carrier 78.

122 is a spring connecting the horizontal arm 121 of the bell-crank lever 119 to the bracket 116 as to an ear 123 thereon and tends to rock the bell-crank lever so as to draw the finger-bar 112 horizontally and move the frictional pad 111 toward the gage-finger 108.

124 and 125 are cams on the shaft 102 and may be integrally connected to a common hub-piece 126, as shown. The cams 124 125 are adapted to operate upon the curved lever 118, and may respectively operate upon it through the medium of the friction-rollers 127 and 128 on the lever. The lower end of the lever 118 may pass through and slide in a slot 129, formed through the base of the frame 93, so as to be steadied and guided in its movements. (See Figs. 35, 36, and 37.)

I have shown the lever 118 pivoted to the bar 112 at a point between the frictional pad 111 and the fulcrum of the lever in the arm 120. Consequently, when the lever 118 is lifted by the cam 124 the pad 111 is lifted to a greater extent than the lever 118, and because the cam 125 is between the fulcrum of the lever 118 in the link 117 and the point where the lever 118 is pivoted to the bar 112 the lever 112 and its pad 111 are moved by the cam 125 a greater distance than the cam moves the roller 128 and the lever 118. When the constructions are made as shown, the movements of the pad 111 in all directions will have about double the amplitude of the movements of those parts of the lever 118 which are directly adjacent to the cams. While this arrangement is preferable as permitting the use of small operating parts, I do not consider it essential to this portion of my invention.

I will now explain the operation of the parts described in moving the pads 111 and drawing the sheets up to the gage-fingers, reference being had particularly to Figs. 35 and 36. Supposing the parts to be in their normal positions, as shown by full lines 111, 112, 117, 118, 119, &c., in Fig. 35, with the friction-rollers 127 128 resting upon the high parts of their respective cams 124 125 and the pad 111 elevated. As the cams rotate in the direction shown by the arrow, the low part of the cam 124 comes first under the roller 127 and permits the lever 118 and attached parts to fall into the position shown by the dotted lines 111$^a$, 112$^a$, 117$^a$, 118$^a$, &c., with the pad 111$^a$ resting upon the sheet. The low part of the cam 124 may be cut so low that when the pad 111$^a$ rests upon the sheets the roller 127 will not rest upon the cam, but the entire weight of the pad 111$^a$, and the other parts which were normally supported by the cam 124, except so far as these parts may be supported by the arm 120, will rest upon the sheet, thereby pressing the pad against the sheet. By the time that the registering-pad has reached the sheet 77$^d$ the cams will have turned into the position shown by dotted lines 124$^a$ 125$^a$, Fig. 35. As the cams 124 125 still further rotate, the low part of the cam 125 comes under the roller 128, and the lever 118 and attached parts, being no longer held out by the cam, are drawn by the action of the spring 122 into the position shown by full lines 111, 112, 117, 118, 119, &c., Fig. 36. During this movement the registering-pad 111 draws the sheet 77$^a$ sidewise—as, for instance, from the position shown in Fig.

35 to that shown in Fig. 36—and registers it. The movement of the pad 111 last described is limited when the roller 128 rests against the low part of the cam 125. While I have spoken of the horizontal movement of the pad 111 as taking place after the pad has fully rested upon the sheet, I prefer in practice to adjust the cams so that the horizontal movement will commence slightly before the drop is fully accomplished, so as to lessen the time that the pad will rest upon the sheet. The action of the spring 122 gives to the pad 111 a yielding movement when it draws the sheet sidewise, so that if the sheet should rest against the gage-fingers before the horizontal movement of the pad is accomplished, the pad will yield in its movement and stop until it is lifted from the sheet, instead of sliding over or doubling up the sheet, with the possibility of scarring it or impairing the accuracy of its registration. The tension of the spring 122 may be adjusted to produce the action described. When thin or delicate sheets are being operated upon, the finger-gage may be adjusted close to the pad 111—for instance, as closely as the position indicated by dotted lines 108$^a$ in Fig. 36. When so adjusted the shortened distance between the gage-finger and the frictional pad gives to the sheet an increased power to resist the action of the pad, as may be readily understood. As the cams 124 125 further rotate the parts are restored to their normal position. The manner in which the parts are so restored is immaterial, except that the frictional pad should be lifted from the sheet as quickly as possible after the sheet is moved against the gage-fingers. I have shown the cams shaped to first raise the pad 111 vertically by raising the roller 127 to the high part of the cam 124, so as to bring the lever 118 and attached parts into the position shown by dotted lines 111$^b$ 112$^b$ 117$^b$ 118$^b$, &c., in Fig. 36, (when the cams will occupy the position indicated by dotted lines 124$^b$ 125$^b$ in Fig. 36,) and then to move the pad 111 back by raising the roller 128 to the high part of the cam 125, so as to bring the lever 118 and attached parts to their normal position, as shown by full lines 111 112 117 118 119, &c., Fig. 35.

The operations described are repeated for each sheet registered.

It will, of course, be understood that all of the registering-pads move simultaneously in the several movements described.

It is at times desirable to maintain the frictional pad 111 out of action. This may be done in the device which I have shown by providing the finger-bar 112 with lips 130, adapted to engage lips 131 on the frame 93 adjacent to the slot 129. These parts are best seen in Figs. 35, 36, and 37.

132 is a handle attached to the finger-bar 112. When it is desired to place the pad 111 out of action, the finger-bar is raised by its handle 132 and its lips 130 are brought into engagement with the lips 131 on the frame 93. The frictional pad, levers, &c., will then be maintained in the position indicated by full lines 111$^c$ 112$^c$ 117$^c$ 118$^c$ 119$^c$, &c., Figs. 35 and 36, with the frictional rollers 127 128 out of contact with the cams 124 125, so that the cams may rotate without operating the lever 118. One or more of the frictional pads may thus be put out of action. It is usual to put out of action all pads except those operating upon the two ends of the sheets. The most forward pad would, therefore, usually act upon all lengths of sheets; but the other pads may be put in or out of action, so as to cause one pad to operate near the rearmost end of the sheet, according to the length of the sheets which are being fed by the machine. When very long sheets are being operated upon a considerable portion of the rear end of the sheets would be without a registering-pad to operate upon them unless pads were placed nearer the rear end of the carrier than shown in the drawings; but this is usually immaterial, as the rearmost of the pads shown will effectively register that end of the sheets.

*The final spacing out and separating devices.*—These devices consist of a pair of feeding-rollers, stop-gages for causing the sheets to be presented to the rollers at precise intervals, and an adjustable sheet-guide to direct the sheets as they pass from the rollers. In describing these devices I shall refer more particularly to Figs. 1, 2, 3, 4, 8, 38, 39, 40, and 41.

The lower feeding-roller 133 consists of a series of disks 134, carried by a shaft mounted in suitable bearings carried by the side frames 1 1, and the upper feeding-roller 135 consists of a series of disks 136, carried by a body or shaft mounted in bearings held in oscillating frames 138, so as to give to the upper roller an oscillating motion about a portion of the lower feeding-roller. The disks 134 136 may be mounted on their respective shafts in any well-known manner. In the drawings the disks 134 are formed independently of the shaft which carries them, and are provided with hubs screwed or keyed to the shaft; but the disks 136, on account of the small size of the upper roller, are preferably formed integral with the body or shaft of that roller. In Figs. 38 and 39 the disk 134 is shown broken away on one side, as is also the carrier-roller 82, to expose certain other mechanism. The disks 134 136 move in contact and may be composed externally of any suitable material for acting upon the sheets which pass between them. The disks rotate constantly in the direction indicated by arrows, and are properly placed to receive the sheets as they pass from the carrier and withdraw them therefrom.

The bearings 137 of the upper feeding-roller are held in sockets formed in the oscillating frames 138, and are spring-pressed in the usual manner to secure a proper yielding-pressure between the disks 134 136. The frames 138 are mounted on inwardly-projecting portions of the bearings 139, which support the shaft of the lower feeding-roller, so that when the frames 138 oscillate the upper feeding-roller will move in a path concentric with the axis of the lower feeding-roller.

141 is a rocking shaft extending across the machine below the feeding-rollers, and is supported by bearings carried by the side frames 1 1.

142 are arms carried by the rocking shaft 141 at each end, the outer ends of which are adapted to operate upon arms 140, carried by the frames 138. The ends of the arms 142 may be provided with antifriction-rollers 143 to engage the arms 140. As the shaft 141 rocks, the arms 142 act upon the arms 140 and cause the frames 138 to oscillate. Springs 144 connect the lower ends of the arms 140 to the side frames 1 1, or they may connect it to one of the girths 2, as shown. The springs 144 tend to draw the arms 140 against the rollers 143, so that while the rollers 143 press upon the arms 140 and oscillate the frames 138 in one direction the springs 144, by drawing upon the arms 140, cause the frames to oscillate in the other direction upon the return movement of the arms 142.

145 is an arm on the end of the shaft 141, which is connected by a rod 146 with one end of a rocking lever 147, pivoted to a side frame 1. The other end of the lever 147 is adapted to be operated on by a cam 148, and the end of the lever 147 may be provided with an antifriction-roller 149, the better to adapt the end of the lever to receive the action of the cam 148. The cam 148 is fixed on the shaft 101 that drives the registering device. (See Figs. 3 and 4.) When the shaft 101 turns, the cam 148 operates to rock the lever 147, and through the medium of the rod 146 and the arm 145 rocks the shaft 141.

The normal position of the upper feeding-roller 135 and of the parts employed to support and oscillate it is that shown in Figs. 1, 3, and 38, with the roller farthest removed from the carrier. The cam 148 is shaped to communicate a short quick oscillation to the upper feeding-roller, and to allow that roller to remain for the most part in its normal position. Fig. 39 shows the position of the upper feeding-roller and of some of the parts which support and oscillate it when the roller is nearest to the carrier, and in Fig. 3 the dotted lines 145ª and 147ª show the corresponding positions of the arms 145 and 147. When the cam 148 is carried by the shaft 101 and the bevel-gears 103 104 are of the same size, the shafts 101 and 102 will turn in unison, and one oscillation of the top feeding-roller will take place with each stroke made by the frictional pads of the registering device. The cam 148 may of course be fixed on any other shaft or part that rotates synchronously with the movements of the frictional pads of the registering device, or any mechanism other than that described, that will cause the top feeding-roller to oscillate at the proper times, may be employed to oscillate the top roller.

The stop-gage which I prefer to employ consists of a series of intermittently oscillating stop-fingers operating in connection with the top feeding-roller.

150 is a rocker-bar supported by bearings in the side frame 1 1, and located in the space between the carrying-roller 82 and the lower feeding-roller 133 below the plane of the upper surface of the sheet-carrier.

151 are a series of stop-fingers carried by the rocker-bar 150 and terminating in lips or projections 152 directly toward the upper feeding-roller. Normally the fingers 151 extend horizontally, with their lips 152 resting against the upper feeding-roller, as shown in Figs. 1 and 38, a short distance from the intaking-line between the feeding-disks 134 136, on that side of said line on which the sheets approach the disks. The lips 152 are adapted to intercept the advanced free sheet as it passes from the carrier to the feeding-rollers and prevent it from being taken in by the disks 134 136 until the stop-fingers are dropped out of the course of the sheet. The lips 152 are placed as near the intaking-line of the disks of the feeding-rollers as is possible without danger of the stopped sheet being seized by the disks.

I have provided the disks 136 of the upper feeding-roller with shoulders 153, upon which the lips 152 may rest. I have shown one such shoulder 153 and corresponding fingers 151 adjacent to each alternate disk 136, but this arrangement may be varied. The shoulders 153 may be somewhat less in diameter than the disks 136, so that the points of the lips 152 when resting upon the shoulders will rise beyond the peripheries of the disks, so that the edge of the sheet may not pass between the points of the lips and the shoulders on which they rest. (See Fig. 38.) When the bar 150 is rocked the fingers 151 and their lips 152 fall, and the sheet is permitted to pass between the feeding-disks. The lips 152 are usually returned to their normal position before the sheet has passed completely between the disks and rest upon the under side of the moving sheet. The lips 152 fall the instant that the upper feeding-roller commences to make its rearward oscillation.

Various means may be employed to rock the bar 150, but I will describe the means which I have shown for that purpose, referring more particularly to Figs. 38, 39, 40, and 41. Arms 154 are fixed one at either end of the rocker-rod 150, opposite the oscillating frames 138. A cam or projection 155 is carried by each rocking frame 138 and acts upon the corresponding arm 154, and may so act through the medium of antifriction-rollers 156 on the arms. Springs 157 connect the end of each of the arms 154 to a side frame 1 and tend to draw the arms 154 against the cams 155. Normally the parts occupy the position shown in Fig. 38, with the cams 155 touching or nearly touching the rollers 156. When the frames 138 oscillate to move the upper feeding-roller toward the carrier the cams 155 act upon the arms 154, and thereby rock the rod 150 and drop the lips 152 into the position shown in Fig. 39. Because of the shape of the cam 155 the lips 152 drop in about one-half the time taken to move the upper feeding-roller, thus moving the lips almost instantaneously out of the course of the sheets when the frame 138 commences its movement. When the lips 152 fall they pass between the disks 134 of the lower feeding-rollers to a position entirely below the sheet passing between the disks. When the frame 138 makes its return movement the lips 152 are returned to their normal position by the action of the springs 157.

The purpose of oscillating the top feeding-roller is to insure the grasping of the sheets between the feeding-disks without the possibility of derangement of the alignment of the sheets after they have been aligned by the operation of the registering-device and to insure accuracy in the spacing out of the sheets. If the top feeding-roller did not oscillate, but had a fixed position—for instance, that shown in Fig. 38—there would of necessity intervene a space between the lips 152 and the intaking-line of the feeding-rollers. Consequently when the lips 152 moved out of the way of the sheet the sheet would have to move over this intervening space before it could be acted on by the feeding-rollers, and would be so moved by the action of the carrier. In so moving the sheet the carrier, by not acting on every portion of the sheet equally, is liable to turn it slightly from its registered alignment, and because the sheets are at rest upon the moving carrier when they are stopped by the lips 152, with only the weight of the sheets to bind them to the carrier, the carrier would not put every sheet when released by the dropping of the lips 152 into motion and move it over the said space in unvarying equal intervals of time. Hence the accuracy with which the sheets would be spaced out by the operation of the stop-gage and feeding-rollers would be impaired; but by causing the top feeding-roller to oscillate, as described, the intaking-line between the feeding-disks is moved over the edge of the stationary sheet before time has elapsed for the sheet to be acted on by the carrier, and thereby the imperfections recited are remedied. The top feeding-roller returns to its normal position immediately after it has seized the sheet, and in that position continues the withdrawal of the sheet from the carrier.

The sheet-guide which I have shown consists of a plate 158 in front of the feeding-rollers carried by a bar 159, supported in bearings carried by the side frames 1 1, in which it may be rocked to adjust the plate 158 to any required angle to the feeding-rollers.

160 is an arm carried by the bar 159 and provided on its outer end with a slot 161, which receives a stud 162 standing out from the frame side 1. A thumb-nut 163 on the stud 162 clamps the arm 160, with the bar 159 and plate 158, in any adjusted position permitted by the slot 161.

The feed-guide plate 158 is shown in a horizontal position in Figs. 1, 38, and 39. In Fig. 39 the dotted lines show the plate adjusted to an inclined position. The edge of the plate 158 adjacent to the feeding-rollers may be notched to receive the disks 134, so that the guiding-surface of the plate may extend between adjacent disks 134 beyond their peripheries to guide the forward edge of the advancing sheet upon the plate.

The position of the guide-plate 158 and the speed of the feeding-rollers may be adjusted for the purposes and in the manner described and shown in my Letters Patent, No. 540,814, dated June 11, 1895, page 11, lines 33 to 117, inclusive.

*The driving mechanism.*—164 is the main driving-shaft supported by bearings carried by the side frames 11. It may receive power in any suitable manner, either from the machine which is being supplied with sheets or from any other suitable source.

The carrier-roller 83 is provided with a shaft which may receive power from the main shaft 164, as through the gears 165 and 166 on the main shaft and the shaft of the carrier-roll, respectively, and the intermediate gears 167 and 167ª. By substituting gears 165 of different sizes the speed of the shaft of the carrier-roll 83 and of the parts driven therefrom may be varied.

The roller 74 of the withdrawing device may be driven from a gear 168 on the shaft of the carrier-roller 83, transmitting power to the gear 169 on the shaft of the roller 74 through the medium of the intermediate gears 170 and 170ª.

The roller 75 is driven from the roller 74 by a gear 171 on the roller 74, gearing into the gear 172 on the roller 75.

173 is a gear on the opposite end of the shaft of the roller 74, driving a gear 174, mounted on a stud 175, carried by a stud-plate 176, secured to the side 4 of the sheet-holder. (See Figs. 5 and 6.) 177 and 180 are gears also mounted on the stud 175 and secured to the gear 174, so as to turn with it.

The withdrawing-drum may be driven from the gear 177 on the stud 175, transmitting power to the gear 178 on the drum through the medium of the intermediate gear 179, which may be mounted loosely on the journal 35 of the initial sheet-withdrawing cylinder.

The initial sheet-withdrawing cylinder may be driven, through the gear 181 carried by it, from the gear 180 on the stud 175. When the speed of the initial sheet-withdrawing cylinder is to be uniform the gears 180 and 181 may be of ordinary construction; but when the speed of the initial sheet-withdrawing cylinder is to be variable, in the manner hereinbefore described, that cylinder may be driven by cam-shaped gears, as shown. The smallest curved part of the gear 180 is a part of a circle concentric with the stud 175, and extends one-half way around the stud. This portion of the gear 180 meshes with the largest curved part of the gear 181, which also is a part of a circle concentric with the journal 35 and extends one-third way about that journal. The radius of the largest curved part of the gear 181 is one-half greater than the radius of the smallest part of the gear 180, and the said curved parts of the two gears are therefore of equal circumferential length. While the said curved parts of the gears 180 and 181 are turning in mesh, the pad 43 of the initial sheet-withdrawing cylinder is in contact with the withdrawing-drum, and during such contact while the gear 181 makes but one-third of a turn the gear 180 will make one-half of a turn. The remaining portions of the gears 180 and 181 not included in the curved segmental sections already described may be of the shapes shown in Fig. 6, so that the two gears will be in proper mesh at all times as they turn one upon the other. The said remaining portions of the two gears are constructed to have equal lengths of outline, although the said portion of the gear 180 extends but half-way around the stud 175, while the said portion of the gear 181 extends two-thirds way around the journal 35, and these said portions of the gears will move over their respective courses in the same time, the gear 180 making but one-half of a turn while the gear 181 makes two-thirds of a turn. The gear 180 has a uniform speed of rotation, but while it makes one-half of a complete revolution the gear 181 makes one-third of a revolution, and while the gear 180 makes the other one-half of its revolution the gear 181 makes two-thirds of a revolution. By these gears 180 and 181 the initial sheet-withdrawing cylinder may be driven with the variable speed of rotation hereinbefore described. The proportions of the gear 177 to the gear 178, and of the said curved part of the gear 180 to the said curved part of the gear 181, are such that the surface of the pad 43 of the initial sheet-withdrawing cylinder will move with the same speed as the surface of the withdrawing-drum when those surfaces are in contact.

The gears 174, 177, 178, 179, 180, and 181 are connected to the side of the sheet-holder and move with the holder when it is adjusted along the bed-piece 3, and the gear 173 may be adjusted on its shaft to suit the positions into which the gears driven by it and carried by the holder are moved.

The shaft of the roller 74 is extended on the end which carries the gear 173, so as to form a long journal $74^a$, the outer end of which may be supported by a floor-stand 184. A portion of the stud-plate 176 is extended toward the gear 173 and terminates in a yoke 182, (see Fig. 7,) adapted to engage a groove in the hub of the gear 173. (See Fig. 4.) The gear 173 is held on the shaft 74, with freedom of longitudinal movement therein, by a key adapted to slide in the groove 185 in the journal $74^a$. When the holder is adjusted with the gears 174, &c., carried by it, the yoke 182, which is carried by the holder, moves the gear 173 correspondingly on the journal $74^a$ without breaking the driving connection between the gear 173 and the gears driven therefrom.

The carrier-roller 86 is driven from a gear 186 on the shaft of the carrier-roller 83, transmitting power to the gear 187 on the carrier-roller 86, through the medium of intermediate gears 188, $188^a$, and $188^b$. The gear $188^b$ may run loosely on a journal of the carrier-roller 81.

The shaft 101 is driven by the gear 187 on the carrier-roller 86, gearing into a gear 189 on the shaft 101.

Because the gear 168, from which the several parts of the withdrawing device are driven, and the gear 186, from which the shaft 101 is driven, are both carried by the same shaft, and because all of the gears connecting the gears 168 to the initial sheet-withdrawing cylinder and all the gears which connect the gear 186 to the shaft 101 are proportioned for that purpose, the initial sheet-withdrawing cylinder and the shaft 101, from which the registering device and the reciprocating parts of the final spacing-out device are driven, will turn in unison.

The lower feeding-roller 133 of the final spacing-out and separating device is driven from a gear 190 on the main shaft 164, transmitting power to the gear 191 on the lower feeding-roller through the medium of the intermediate gear 192. By changing the size of the gear 191 the speed of the feeding-rollers may be varied. The top feeding-roller is driven from a gear 193 on the shaft of the lower feeding-roller, gearing into a gear 194 on the shaft of top feeding-roller.

By the method of driving described the initial sheet-withdrawing cylinder and the sheet-separating devices carried by it, and the reciprocating parts of the registering and of the final spacing devices, each make a single complete turn or movement with each sheet fed. When the speed of the shaft of the carrier-roller 83 is varied, the speed of the initial sheet-withdrawing cylinder and of all the reciprocating movements of the machine vary correspondingly. The shaft of the roller 83, in view of its function of distributing the power to various parts of the machine, may be termed the "counter" or "power distributing" shaft. While for convenience I have utilized the shaft of the roller 83 as the counter-shaft of the machine, another shaft independent of the carrier-rollers may be employed, if desired, as the countershaft. By varying the speed of the countershaft the machine is adjusted to feed sheets of different lengths, moving slow for long and fast for short sheets; but the feeding-rollers of the final spacing-out and separating device do not partake of these changes of speeds with the countershaft, as these rollers should run at the same speed for all lengths of sheets in the same manner of feeding when the speed of the ruling-machine is not altered. The speed of the feeding-rollers may be changed to suit different manners of feeding without affecting the speeds of the other parts of the machine. When my feeding-machine is driven directly from a shaft of the ruling-machine, any change in the speed of the ruling-machine changes the speed of the entire feeding-machine correspondingly.

*Operation of the machine.*—From the foregoing description of the machine its operation in feeding sheets will be readily understood. The pack of sheets is adjusted in the holding device in the proper position and the sheet-pressers are placed behind the pack. The sheet-holder is adjusted laterally to bring the sheets to proper position relatively to the medial line of the machine to be supplied with sheets. The idler-rollers on the front of the holder, the withdrawing-drum, the initial sheet-withdrawing cylinder, and the registering device are adjusted, as has been described, to suit the position and character of the sheets to be operated upon, and the speeds of the various parts are adjusted to suit the length of sheets and the manner in which they are to be fed. The machine is then started in operation. The sheets are individualized and withdrawn from the pack in the manner already described and are received by the sheet-carrier. If the horizontal part of the carrier occupies an elevated position in respect to the bottom of the sheet-holder, as shown, the sheets are taken by the carrier upward to the horizontal part. When the front edge of the free advanced top sheet on the carrier reaches the front stop the sheet is arrested and the registering device operates to register it. The front stop-fingers then recede and release the sheet, which is seized by the feeding-disks and is delivered to the mechanism which is to perform a subsequent operation upon it.

It is apparent that many details of construction shown are not material to my invention and may be varied in many ways without departing from it, and that portions of my invention may be employed independent of other portions of it, and that in adapting my improved feeding mechanism to different purposes features of the mechanism not required for such purpose may be omitted. For instance, instead of using the rotating buckling-finger described in conjunction with the rotary separator-blade to separate the sheets from the pack, any other appropriate device may be employed to raise a portion of the edge of a sheet preparatory to passing the rotary separator-blade under the edge, and, for instance, the rotary buckling-finger shown could be employed in conjunction with any appropriate means for operating upon the sheet and withdrawing it from the pack after it had been individualized by the rotating finger; and again, for instance, in feeding a printing-machine or other machine having intaking-grippers, the feeding-rollers and feed-gage plate may be removed and the stop-fingers ordinarily pertaining to such machines may be substituted for the stop-fingers which I have shown.

Having now described my invention, what I claim as new, and desire to secure by Letters Patent, is—

1. In a machine for feeding sheets from a pack, the combination with a holder adapted to support a pack of sheets upon their edges in a more or less upright position having an inclined bottom for the edges of the sheets to rest upon, of a presser adapted to rest against the rear or back of the pack of sheets and press the sheets forward over the inclined bottom, antifriction rollers attached to said presser and adapted to move over the said bottom and support the presser when the presser is acting upon the sheets, and a depression or gutter along the rear edge of said bottom adapted to receive one or more of the rollers when the presser is drawn back to the rear of the bottom and thereby retain the presser permanently upon the rear of the bottom when the presser is not required to rest against the sheets.

2. In a machine for feeding sheets from a pack, the combination with a holder adapted to support a pack of sheets upon their edges in a more or less upright position having an inclined bottom for the edges of the sheets to rest upon, of a presser adapted to rest against the rear or back of the pack of sheets to press the sheets forward over the inclined bottom and provided with a hook or hooks, antifriction rollers attached to said presser and adapted to move over the said bottom and to support the presser when it is acting upon the sheets, a depression or gutter along the rear edge of said bottom adapted to receive one or more of the rollers upon the presser when it is being turned over the edge of the bottom, and a ledge formed along the said bottom adapted to receive the hook or hooks upon the presser and thereby support the presser in a hanging position when it is turned over away from the bottom.

3. In a machine for feeding sheets from a pack, the combination of a sheet holder adapted to support a pack of sheets, a withdrawing device carried by said holder and adapted to withdraw the sheets from the pack, a supporting frame independent from said sheet holder, conveying devices carried by said supporting frame adapted to receive the sheets from the withdrawing device and convey them therefrom, a registering device carried by said supporting frame for registering the sheets while they are supported by the conveying devices, means to move the said sheet holder and parts carried thereby laterally without moving the said supporting frame and the parts carried thereby so as to adjust the sheets in the holder relatively to the medial line of the machine to be supplied with sheets, power devices carried by the sheet holder for operating said withdrawing device, power devices carried by said supporting frame for operating said conveying and registering devices, and an adjustable power connection between the power devices which operate the withdrawing device and the power devices which operate the conveying and registering devices arranged so that the said withdrawing, conveying and registering devices may be operated and the movements of the said devices relatively to each other maintained the same in whatever position the sheet holder and parts carried thereby may be adjusted.

4. In a machine for feeding sheets from a pack, the combination of a sheet holder adapted to support a pack of sheets, a withdrawing device carried by said holder and adapted to withdraw the sheets from the pack, a supporting frame independent from said sheet holder, conveying devices carried by said supporting frame adapted to receive the sheets from the withdrawing device and convey them therefrom, ways arranged transversely across the machine on which said sheet holder may be moved, a hand operated device to act on said sheet holder to move it and the parts carried thereby along said ways without moving the said supporting frame and the parts carried thereby, power devices carried by the sheet holder adapted to operate said withdrawing device, power devices carried by said supporting frame adapted to operate said conveying devices, and an adjustable power connection between the power devices which operate the withdrawing device and the power devices which operate the conveying devices arranged so that the said withdrawing and conveying devices may be operated and the movements of the said devices relatively to each other maintained the same in whatever position the sheet holder and parts carried thereby may be adjusted.

5. In a machine for feeding sheets from a pack, the combination of a sheet holder adapted to support a pack of sheets, a withdrawing device carried by said holder and adapted to withdraw the sheets from the pack, frame sides independent from said sheet holder, devices carried by said frame sides adapted to receive the sheets from the withdrawing device and convey them therefrom, means to move the said sheet holder and the parts carried thereby laterally without moving the said frame sides and the parts carried thereby so as to adjust the position of the sheets in the holder relatively to the medial line of the machine to be supplied with sheets, power devices carried by the sheet holder adapted to operate said withdrawing device, power distributing devices carried by said frame sides, and a power connection between the power devices carried by the frame sides and the power devices carried by the sheet holder having capacity of adjustment by the act of moving the sheet holder, whereby the said power devices carried by the sheet holder and the parts operated thereby will be driven in whatever position the sheet holder may be adjusted in relation to said frame sides.

6. In a machine for feeding sheets from a pack, the combination of a laterally adjustable sheet holder adapted to support a pack of sheets upon edge in a more or less upright position, mechanism carried by the laterally adjustable holder adapted to operate successively upon the sheets and partially withdraw them from the pack, a pair of rollers independent of the sheet holder carried by the feeding machine adapted to receive the advanced edges of the partially withdrawn sheets and to assist in the withdrawal of them from the pack, power devices carried by the sheet holder for operating the withdrawing mechanism thereon, power devices carried by the feeding machine independent of the sheet holder connected with the power devices of the sheet holder so that the sheet holder may be adjusted laterally to vary the position of the sheets with reference to the medial line of the feeding machine without breaking the power transmitting connections to the withdrawing devices of the holder.

7. In a machine for feeding sheets from a pack, the combination of a buckling finger having a tubular body, a frictional pad in one end of said tubular body adapted to act upon the surface of the sheets in the pack, a plug threaded into said tubular body bearing against the inner end of said pad adapted to be adjusted in the tubular body and when it is adjusted to adjust the frictional pad correspondingly, and means to operate said buckling finger to cause it to buckle an edge of the outermost sheet in the pack.

8. In a machine for feeding sheets from a pack, the combination of a buckling finger having a tubular body, a frictional pad in one end of said tubular body adapted to act upon the surface of the sheets in the pack, a plug threaded into said tubular body bearing against the inner end of said pad adapted to be adjusted in the tubular body and when it is adjusted to adjust the frictional pad correspondingly, and a rotary holder arranged adjacent to an edge of the pack of sheets, and adapted to support and rotate said buckling finger to cause it to act upon and form a buckle in the outermost sheet in the pack with each revolution of the holder.

9. In a machine for feeding sheets from a pack, the combination of a buckling finger, a rotating holder arranged adjacent to an edge of the pack of sheets to support and rotate said buckling finger in such manner that that end of the finger which acts upon the sheets shall rotate in a plane substantially at right angles to the face of the pack and thereby cause the finger to act upon and form a buckle in an edge of the outermost sheet in the pack with each rotation of the holder means for securing said finger to said holder so as to permit to the operative end of the finger, as it rotates, freedom of movement transverse to its axis of revolution, and a spring arranged to act on said finger to give to the operative end of the finger a yielding pressure against the sheets when it acts upon them, for the purpose described.

10. In a machine for feeding sheets from a pack, the combination of a rotating finger holder arranged adjacent to an edge of the pack, a buckling finger carried by and rotating with said holder, and devices acting on the buckling finger to alternately project and retract its operative end embracing a spring arranged to give to the operative end of the finger a yielding pressure against the sheets when it acts upon them for the purpose described.

11. In a machine for feeding sheets from a pack, the combination of a rotating finger holder arranged adjacent to an edge of the pack and provided with a hole transversely through the body of the holder, a buckling finger located in said hole so as to rotate with the holder and devices acting on the buckling finger to alternately project and retract the operative end of the finger from its supporting hole embracing a spring arranged to give to the operative end of the finger a yielding pressure against the sheets when it acts upon them for the purpose described.

12. In a machine for feeding sheets from a pack, the combination of a rotating finger holder arranged adjacent to an edge of the pack, a buckling finger carried by and rotating with said holder, a frictional pad secured to the buckling finger and constituting its operative end, means to adjust the frictional pad in respect to the buckling finger; and a device for reciprocating said buckling finger to project the operative end of the finger when it is to act upon a sheet and to retract the finger when its end is out of contact with the sheet embracing a spring arranged to give to the operative end of the finger a yielding pressure against the sheets when it acts upon them for the purpose described.

13. In a machine for feeding sheets from a pack, the combination of a rotating finger holder arranged adjacent to an edge of the pack and provided with a hole transversely through the body of the holder, a buckling finger located in said hole so as to rotate with the holder, a frictional pad secured to the buckling finger and constituting its operative end, means to adjust the frictional pad in respect to the buckling finger; and a device to move the buckling finger in the hole to project the operative end of the finger from the holder when it is to act upon a sheet and to retract the finger when its end moves out of operative contact with the sheet embracing a spring for projecting the finger outward from the holder and a stationary cam to cause the retraction of the finger for the purpose described.

14. In a machine for feeding sheets from a pack, the combination of a support for a pack of sheets, a guard or lip adapted to overlie and press against the surface of the pack near an edge thereof, a rotating finger holder arranged adjacent to the said guard or lip, a buckling finger carried by and rotating with said holder a frictional pad secured to the buckling finger and constituting its operative end, means to adjust the frictional pad in respect to the buckling finger; and a device for reciprocating said buckling finger to project the operative end of the finger when it is to operate upon a sheet and to retract the finger when its end moves out of contact with the sheet, embracing a spring arranged to give to the operative end of the finger a yielding pressure against the sheets when it acts upon them for the purpose described.

15. In a machine for feeding sheets from a pack, the combination of a support for a pack of sheets, a guard or lip adapted to overlie and press against the surface of the pack near an edge thereof, a rotating finger holder arranged adjacent to the said guard or lip and provided with a hole passing transversely through its body, a buckling finger located in said hole so as to rotate with the holder, and a device for moving the buckling finger in said hole to project the operative end of the finger from the hole when it is to act upon a sheet and to retract the finger when its end moves out of operative contact with the sheet, embracing a spring for projecting the finger outward from the holder and a stationary cam to cause the retraction of the finger all combined and operating so that the buckling finger will act upon the surface of the pack and draw the sheets successively from under the said guard or lip and thereby individualize them from the pack.

16. In a machine for feeding sheets from a pack, the combination of a support for a pack of sheets, a guard composed of two adjacent lips adapted to overlie and press against an edge of the pack near one corner thereof, a buckling finger, and a rotating holder arranged adjacent to said guard, having its axis of rotation in a line substantially parallel to that edge of the pack covered by said guard, and carrying and rotating said buckling finger in such manner that an end of the finger shall act successively upon the edges of the sheets at a point between the adjacent lips of said guard to draw the sheets from under the lips and thereby individualize successive sheets from the pack.

17. In a machine for feeding sheets from a pack, the combination of a support for a pack of sheets, a guard or lip adapted to overlie and press against the surface of the pack near an edge thereof, a rotating finger holder arranged adjacent to the said guard or lip and provided with a hole passing transversely through its body, with a slot extending longitudinally in the body of the holder from said hole outward through the outer face of the holder, a buckling finger located in said hole so as to rotate with the holder, a shank fixed to said buckling finger and extending outward from said finger through said slot with its end outside of the face of the holder, and devices, embracing a cam acting on said shank, to move the buckling finger in its supporting hole and thereby project its operative end from the said hole when it is to act upon a sheet and to retract the finger when its end moves out of operative contact with the sheet.

18. In a machine for feeding sheets from a pack, the combination of a support for a pack of sheets, a guard or lip adapted to overlie and press against the surface of the pack near an edge thereof, a rotating finger holder arranged adjacent to the said guard or lip and provided with a hole passing transversely through its body, a tube forming the body part of a buckling finger located in said hole and carried by and rotating with the holder, a frictional pad in one end of said tube adapted to act upon the surfaces of the sheets in the pack, a device carried by said tube adapted to adjust the said frictional pad in the tube and to secure it therein when it is adjusted, and means to move the tube longitudinally in said hole to project and retract the frictional pad for the purpose described.

19. In a machine for feeding sheets from a pack, the combination of a support for a pack of sheets, a guard or lip adapted to overlie and press against the surface of the pack near an edge thereof, a rotating finger holder arranged adjacent to the said guard or lip and provided with a hole passing transversely through its body with a longitudinal slot extending therefrom, a tube forming the body part of a buckling finger located in said hole and carried by and rotating with the holder, a frictional pad in one end of the said tube adapted to act upon the surface of the sheets in the pack, a device carried by said tube adapted to adjust the said frictional pad in the tube and to secure it therein when it is adjusted, a shank carried by the tube and extending through said slot, and devices, embracing a cam acting on said shank, to reciprocate the tube in the holder and project and retract its end which carries the frictional pad.

20. In a machine for feeding sheets from a pack, the combination of a support for a pack of sheets, an individualizing device adapted to raise a portion of the outermost sheet at its edge from the other sheets in the pack, and a rotary separator blade having its separating edge extended spirally in the direction of its axis of rotation and arranged with its axis of rotation substantially parallel to that edge of the sheet which is raised by the individualizing device adapted to enter first under the raised portion of the sheet and thence pass under and separate the entire edge of the sheet from the pack and bend it outward therefrom.

21. In a machine for feeding sheets from a pack, the combination of a support for a pack of sheets, an individualizing device adapted to operate upon the surface of the outermost sheet in the pack at a point on that edge of the sheet which lies most advanced in the direction in which the sheet is to be moved and to bend a portion of that edge outward without bending the entire edge of the sheet, a rotary separator blade having its separating edge extended spirally in the direction of its axis of rotation and arranged with its axis of rotation substantially parallel to the said most advanced edge of the sheet adapted to enter first under said bent out portion of the edge of the sheet and thence to pass under and separate the entire edge of the sheet from the pack and to bend it outward therefrom, and devices for seizing upon the edge of the sheet after it is bent out and withdrawing the sheet from the pack.

22. In a machine for feeding sheets from a pack, the combination with a support for a pack of sheets, and an individualizing device adapted to operate upon the surface of the outermost sheet in the pack near one corner and to bend outward a portion of an edge thereof, of a rotating blade having its forward edge inclined with reference to the axis about which the blade rotates and having every point along that edge equally distant from said axis whereby as the blade rotates its edge will move in a cylindrical pathway, mounted in such manner that a portion of space will be left unoccupied within the inclosure of the said cylindrical pathway with a free opening from said space outward through said pathway adjacent to the inclined forward edge of the blade, arranged with its axis parallel to the face of the pack and in a position such that the said cylindrical pathway will partly overlie that edge of the outermost sheet in the pack which is bent outward by the individualizing device, rotating in a direction inward from the edge toward the body of the pack and adapted to enter first under said bent out portion of the edge of the sheet and thence pass under and separate the entire edge of the sheet from the pack and bend it outward therefrom causing the edge of the sheet as it is bent outward to pass through the said unoccupied space, and devices for seizing upon the edge of the sheet after it is bent outward and withdrawing the sheet from the pack.

23. In a machine for feeding sheets from a pack, the combination with an individualizing device to raise a portion of an edge of the outermost sheet, of a rotating longitudinally recessed roller 33 carrying the separating blade 44 adapted to enter under the raised portion of the outermost sheet and separate an edge of the sheet from other sheets in the pack as the roller rotates.

24. In a machine for feeding sheets from a pack, the combination with a support for a pack of sheets, and an individualizing device adapted to operate upon the surface of the outermost sheet in the pack near one corner thereof and to bend outward a portion of that edge of the sheet which lies most advanced in the direction in which the sheet is to be moved, of a rotating roller arranged adjacent to and parallel with the edge of the pack so as to intercept the curved path traversed by the edge of a sheet when it is bent outward, and having a portion of its body cut away on one side to form a recess through which the edge of the sheet when it is bent outward may freely pass, a blade carried by the body of the roller and projecting over a portion of said recess and having its forward edge inclined with reference to the axis of the roller and adapted as it rotates with the roller to enter first under said bent out portion of the edge of the sheet and thence pass under and separate the entire edge of the sheet from the pack and bend it outward therefrom, and withdrawing devices acting on the outwardly bent edge to withdraw the sheet from the pack.

25. In a machine for feeding sheets from a pack, the combination with a support for a pack of sheets, of a rotating roller arranged adjacent to and partly overlying an edge of the pack and having a portion of its body cut away to form a longitudinal recess, an individualizing device carried in part by said roller and adapted to act upon the outermost sheet in the pack and to bend a portion of an edge of that sheet outward, and a blade carried by the body of the roller and projecting over a portion of said longitudinal recess, adapted as it rotates with the roller to enter first under said bent out portion of the edge of the sheet and thence to pass under and separate the entire edge of the sheet from the pack and bend it outward therefrom, the edge of the sheet as it is bent out passing through the longitudinal recess in the roller.

26. In a machine for feeding sheets from a pack, the combination with a support for a pack of sheets, of a guard or lip adapted to overlie and press against an edge of the pack near one corner thereof, a rotating roller arranged adjacent to and partly overlying that edge of the pack covered by said guard or lip, and having a portion of its body cut away on one side to form a longitudinal recess, a buckling finger carried by and rotating with said roller adapted to act upon the outermost sheet in the pack at a point adjacent to the said guard or lip to draw the sheet from under the guard or lip and then to release its action upon the sheet to allow the sheet to extend itself over the guard or lip whereby a space shall intervene between that portion of the edge of the said sheet adjacent to the guard or lip and the subjacent sheets of the pack, a blade carried by the body of the roller and projecting over a portion of said longitudinal recess and having its forward edge inclined with reference to the axis of the roller and adapted as it rotates with the roller to enter first into said space under the sheet and thence pass under and separate the entire edge of the sheet from the pack and bend it outward therefrom, the edge of the sheet as it is bent out passing through the longitudinal recess in the roller.

27. In a machine for feeding sheets from a pack, the combination of a support for a pack of sheets, an individualizing device adapted to raise a portion of the outermost sheet at its edge from the other sheets in the pack, a longitudinally recessed roller provided with a frictional surface, mounted adjacent to and partly overlying that edge of the outermost sheet in the pack which is raised by the individualizing device and rotating in a direction inward from the edge toward the body of the pack, a blade carried by said roller adapted as it rotates with the roller to enter first under the raised portion of the sheet and thence to pass under and individualize the entire edge of the sheet from the pack and bend it outward therefrom through the longitudinal recess in the roller, and a cylinder or drum adapted to act in conjunction with the frictional surface of the roller to withdraw the individualized sheet to a greater or less extent from the pack.

28. In a machine for feeding sheets from a pack, the combination of a support for a pack of sheets, an individualizing device adapted to raise a portion of the outermost sheet at its edge from the other sheets in the pack, a longitudinally recessed roller provided with a frictional surface, mounted adjacent to and partly overlying that edge of the outermost sheet in the pack which is raised by the individualizing device and rotating in a direction inward from the edge toward the body of the pack, a blade carried by said roller adapted as it rotates with the roller to enter first under the raised portion of the sheet and thence to pass under and individualize the entire edge of the sheet from the pack and bend it outward therefrom through the longitudinal recess in the roller, and a cylinder or drum adapted to act in conjunction with the frictional surface of the roller to withdraw the individualized sheet partially from the pack, and an auxiliary withdrawing device to receive the advanced edge of the partially withdrawn sheet and to assist in withdrawing the sheet from the pack.

29. In a machine for feeding sheets from a pack, the combination of a support for a pack of sheets, a withdrawing drum mounted adjacent to the pack of sheets adapted by frictional contact to seize upon the surface of a sheet when the sheet is pressed against it, a rotating roller mounted adjacent to, parallel with and partly overlying an edge of the pack of sheets, and having a longitudinal recess to permit the passage of the edge of a sheet when it is bent outward, an individualizing device carried in part by said roller and adapted to act upon the outermost sheet in the pack and to bend a portion of an edge of that sheet outward, a blade carried by said roller having its forward edge directed in a slanting longitudinal course in respect to the axis of the cylinder and adapted as it rotates with the cylinder to enter first under said bent out portion of the edge of the sheet and thence pass under and separate the entire edge of the sheet from the pack and bend it outward therefrom, and a frictional pad carried by said roller adapted to press the bent edge of the sheet against the surface of the drum and thereby cause the sheet to be withdrawn to a greater or less extent from the pack.

30. In a machine for feeding sheets from a pack, the combination of a support for a pack of sheets, a withdrawing drum mounted adjacent to the pack of sheets adapted by frictional contact to seize upon the surface of a sheet when the sheet is pressed against it, a rotating roller mounted adjacent to, parallel with and partly overlying an edge of the pack of sheets, and having a longitudinal recess to permit the passage of the edge of a sheet when it is bent outward, an individualizing device carried in part by said roller and adapted to act upon the outermost sheet in the pack and to bend a portion of an edge of that sheet outward, a blade carried by said roller having its forward edge directed in a slanting longitudinal course in respect to the axis of the cylinder and adapted as it rotates with the cylinder to enter first under said bent out portion of the edge of the sheet and thence pass under and separate the entire edge of the sheet from the pack and bend it outward therefrom, and a frictional pad carried by said roller adapted to press the bent edge of the sheet against the surface of the drum and thereby cause the sheet to be partially withdrawn from the pack, and an auxiliary withdrawing device to receive the advanced edge of the partially withdrawn sheet and to assist in withdrawing the sheet from the pack.

31. In a machine for feeding sheets from a pack, the combination with a support for a pack of sheets, of a guard or lip adapted to overlie and press against an edge of the pack near one corner thereof, a withdrawing drum mounted adjacent to the pack of sheets adapted by frictional contact to seize upon the surface of a sheet when the sheet is pressed against it, a rotating roller mounted adjacent to parallel with and partly overlying that edge of the pack of sheets covered by said guard or lip and having a longitudinal recess to permit the passage of the edge of a sheet when it is bent outward, a buckling finger carried by and rotating with said roller adapted to act upon the outermost sheet in the pack at a point adjacent to the said guard or lip to draw the sheet from under the guard or lip and then to release its action upon the sheet to allow the sheet to extend itself over the guard or lip whereby a space shall intervene between that portion of the edge of the said sheet adjacent to the guard or lip and the subjacent sheets of the pack, a blade carried by said roller having its forward edge directed in a slanting longitudinal course in respect to the axis of the cylinder and adapted as it rotates with the cylinder to enter first into said space under the edge of the sheet and thence pass under and separate the entire edge of the sheet from the pack and bend it outward therefrom, and a frictional pad carried by said roller adapted to press the bent edge of the sheet against the surface of the drum and thereby cause the sheet to be withdrawn to a greater or less extent from the pack.

32. In a machine for feeding sheets from a pack, the combination with a support for a pack of sheets, of a guard or lip adapted to overlie and press against an edge of the pack near one corner thereof, a withdrawing drum mounted adjacent to the pack of sheets adapted by frictional contact to seize upon the surface of a sheet when the sheet is pressed against it, a rotating roller mounted adjacent to parallel with and partly overlying that edge of the pack of sheets covered by said guard or lip and having a longitudinal recess to permit the passage of the edge of a sheet when it is bent outward, a buckling finger carried by and rotating with said roller adapted to act upon the outermost sheet in the pack at a point adjacent to the said guard or lip to draw the sheet from under the guard or lip and then to release its action upon the sheet to allow the sheet to extend itself over the guard or lip whereby a space shall intervene between that portion of the edge of the said sheet adjacent to the guard or lip and the subjacent sheets of the pack, a blade carried by said roller having its forward edge directed in a slanting longitudinal course in respect to the axis of the cylinder and adapted as it rotates with the cylinder to enter first into said space under the edge of the sheet and thence pass under and separate the entire edge of the sheet from the pack and bend it outward therefrom, and a frictional pad carried by said roller adapted to press the bent edge of the sheet against the surface of the drum and thereby cause the sheet to be partially withdrawn from the pack, and a pair of rollers adapted to seize the advanced edge of the partially withdrawn sheet and to assist in the withdrawal of it from the pack.

33. In a machine for feeding sheets from a pack, the combination of a support for a pack of sheets, an individualizing device adapted to raise a portion of the outermost sheet at its edge from the other sheets in the pack, a longitudinally recessed roller provided with a frictional surface, mounted adjacent to and partly overlying that edge of the outermost sheet in the pack which is raised by the individualizing device and rotating in a direction inward from the edge toward the body of the pack, a blade carried by said roller adapted as it rotates with the roller to enter first under the raised portion of the sheet and thence to pass under and individualize the entire edge of the sheet from the pack and bend it outward therefrom through the longitudinal recess in the roller, and a cylinder or drum adapted to act in conjunction with the frictional surface of the roller to withdraw the individualized sheet to a greater or less extent from the pack, and means to drive the said roller with a variable speed of rotation whereby the roller will move slowly when its frictional surface is turned toward the said withdrawing drum and faster when its frictional surface is turned away from the drum.

34. In a machine for feeding sheets from a pack, the combination with a support for a pack of sheets, of a guard or lip adapted to overlie and press against an edge of the pack near one corner thereof, a withdrawing drum mounted adjacent to the pack of sheets adapted by frictional contact to seize upon the surface of a sheet when the sheet is pressed against it, a rotating roller mounted adjacent to, parallel with and partly overlying that edge of the pack of sheets covered by said guard or lip and having a longitudinal recess to permit the passage of the edge of a sheet when it is bent outward, a buckling finger carried by and rotating with said roller adapted to act upon the outermost sheet in the pack at a point adjacent to the said guard or lip to draw the sheet from under the guard or lip and then to release its action upon the sheet to allow the sheet to extend itself over the guard or lip whereby a space shall intervene between that portion of the edge of the said sheet adjacent to the guard or lip and the subjacent sheets of the pack, a blade carried by said roller having its forward edge directed in a slanting longitudinal course in respect to the axis of the cylinder and adapted as it rotates with the cylinder to enter first into said space under the edge of the sheet and thence pass under and separate the entire edge of the sheet from the pack and bend it outward therefrom, and a frictional pad carried by said roller adapted to press the bent edge of the sheet against the surface of the drum and thereby cause the sheet to be withdrawn to a greater or less extent from the pack, and means to drive the said roller with a variable speed of rotation whereby the roller will move slowly when its frictional pad is turned toward the said withdrawing drum and faster when its frictional pad is turned away from the drum.

35. In a machine for feeding sheets from a pack, the combination of a support for a pack of sheets, an individualizing device adapted to operate upon the outermost sheet in the pack and to bend a portion of an edge of that sheet outward, a longitudinally recessed roller provided with a frictional surface and mounted adjacent to and partly overlying that edge of the outermost sheet in the pack which is bent outward by the individualizing device, a blade carried by said roller, a withdrawing drum mounted adjacent to said roller, bearings for said roller and for said drum, springs adapted to act upon said bearings to force the said roller and drum toward one another, and adjustable stops to limit the movement of the bearings, for the purpose described.

36. In a machine for feeding sheets from a pack, the combination of a support for a pack of sheets, an individualizing device adapted to operate upon the outermost sheet in the pack and to bend a portion of an edge of that sheet outward, a longitudinally recessed roller provided with a frictional surface and mounted adjacent to and partly overlying that edge of the outermost sheet in the pack which is bent outward by the individualizing device, a blade carried by said roller, a withdrawing drum mounted adjacent to said roller, bearings for said roller and for said drum, adjustable frames to support said bearings, springs carried by said frames adapted to act on said bearings to press the said roller and drum toward one another, adjustable stops carried by said frames to limit the movement of said bearings, means to adjust said frames so that the said roller and drum may be adjusted relatively to the face of the pack of sheets without affecting the relative positions of the roller and drum, for the purpose described.

37. In a machine for feeding sheets from a pack, the combination of a support for a pack of sheets an individualizing device adapted to raise a portion of the outermost sheet at its edge from other sheets in the pack, and a separating blade arranged to rotate with its axis of rotation adjacent to and substantially parallel to that edge of the sheet which is raised by the individualizing device and adapted to enter under the raised portion of the sheet and to pass under and separate the entire edge of the sheet from the pack and bend it outward therefrom.

38. In a machine for feeding sheets from a pack, the combination with a support for a pack of sheets of a guard or lip adapted to overlie and press against an edge of the pack near one corner thereof, a buckling finger arranged to act upon the outermost sheet in the pack at a point adjacent to the said guard or lip means to move said buckling finger to cause its operative end to make contact with the sheet and draw the sheet from under the guard or lip and then to cause the operative end of the finger to move away from the sheet thereby releasing its action upon the sheet to allow the sheet to extend itself over the guard or lip whereby a space shall intervene between that portion of the edge of the said sheet adjacent to the guard or lip and the subjacent sheets of the pack, and a separator blade adapted to enter first into said space under the sheet and thence pass under and individualize the entire edge of the sheet from the pack.

39. In a sheet feeding machine, the combination of a support for a pack of sheets, an individualizing device adapted to raise a portion of the outermost sheet at its edge from the other sheets in the pack, a rotary separator blade having a continuous separating edge extended spirally in the direction of its axis of rotation and adapted to enter first under the raised portion of the sheet and thence pass under and separate an entire edge of the sheet from the pack and bend it outward therefrom, withdrawing devices to seize upon the outwardly bent portion of the sheet and withdraw the sheet from the pack, a conveyer to receive the sheets as they pass from the withdrawing devices, power devices to operate the said individualizing device and the said rotary separator blade to cause the individualizing device to act upon and individualize a series of sheets and to cause the separator blade to bend outward each sheet after it is individualized while sheets previously individualized and bent outward are in process of withdrawal from the pack, and power devices to operate the said withdrawing devices so that the withdrawing devices can act upon the series of sheets without interfering with the action of the individualizing device and separator blade, all combined and operated so that the sheets will be withdrawn from the pack and placed upon the conveyer in a series lying one upon another with the forward edge of each sheet somewhat advanced beyond the forward edge of the next following sheet.

40. In a sheet feeding machine, the combination of an endless traveling apron adapted to receive sheets and to convey them over its surface, rollers for supporting and driving said apron, means to depress the surface of the apron so as to produce a transverse pocket extending below the general surface of the apron, cross bars extending transversely over said apron, a frame adapted to move over said cross bars, a side gage finger carried by said frame and extending into said pocket and a hand operated device to act on said frame to adjust it upon said cross bars.

41. In a sheet feeding machine, the combination of an endless traveling apron adapted to receive sheets and to convey them over its surface, rollers for supporting and driving said apron, means to depress the surface of the apron at intervals so as to produce a series of transverse pockets extending below the general surface of the apron, a stop adapted to engage the front edges of the sheets successively as they pass upon said apron to arrest the sheets in their forward movement, cross bars extending transversely over said apron, a side gage adapted to move over said cross bars having a series of fingers or projections adapted to extend into said pockets, and a device to engage the surface of a sheet which has been arrested by the front stop and to draw the sheets laterally against said fingers in whatever position the fingers may happen to be adjusted.

42. In a sheet feeding machine, the combination of an endless traveling apron adapted to receive and convey the sheets over its surface, transverse rollers or guides 89, 90 and 91, about which the apron passes to form a series of transverse depressions or pockets in its surface, side gage fingers having their lower ends projecting into said depressions or pockets, cross bars extending transversely over said apron, a frame carrying said side gage fingers adapted to move over said cross bars, and a device to engage the surface of a sheet and to move the sheet laterally against the side gage fingers in whatever position said fingers may happen to be adjusted.

43. In a sheet feeding machine, the combination of an endless traveling apron adapted to receive sheets and to convey them over its surface, rollers for supporting and driving said apron, a group of rollers arranged to depress the plane of said apron so as to form a transverse pocket or depression in its face, a stop adjacent to the end of the apron adapted to engage the front edges of the sheets as they pass upon said apron to arrest the sheets in their forward movement, cross bars extending transversely over said apron, a side gage adapted to move over said cross bars having a finger or projection extending into said pocket or depression and also a finger or projection extending into the space beyond the end of the apron adjacent to the front stop, and a device to engage the surface of a sheet which has been arrested by the front stop and to draw the sheet laterally against said fingers in whatever position the fingers may happen to be adjusted.

44. In a sheet feeding machine, the combination of an endless traveling apron adapted to receive sheets and to convey them over its surface, rollers for supporting and driving said apron, a series of independent groups of rollers the rollers of each group being arranged to depress the plane of said apron so as to form a transverse pocket or depression in its face and the combined action of the several groups of rollers being to form a series of similar pockets or depressions, a stop to engage the front edges of the sheets successively as they pass upon said apron to arrest the sheets in their forward movement, side gage fingers having their lower ends projecting into said pockets or depressions, cross bars extending transversely over said apron, a frame carrying said side gage fingers adapted to move over said cross bars, a hand operated device adapted to act on said frame to adjust it upon said cross bars, means to clamp said frame to secure it in any adjusted position, and a device to engage the surface of a sheet which has been arrested by the front stop and to draw the sheet laterally against the side gage fingers in whatever position the said fingers may happen to be adjusted.

45. In a machine for feeding sheets from a pack, the combination of a sheet carrier constructed with a moving carrying surface having a transverse pocket or depression across its said surface, a stop adapted to engage the front edges of the sheets successively as they pass upon the carrier to arrest the sheets in their forward movement, a side gage finger having its lower end projecting into said pocket or depression, adapted to engage the side edges of the sheets, a sheet moving device adapted to act on the surface of a sheet which has been arrested by the front stop to draw the sheet laterally against the side gage finger, a frame carrying said side gage finger and sheet moving device, and means to adjust said frame transversely across the machine whereby the said side gage finger and sheet moving device may be adjusted to suit the width or position of the sheets upon the carrier without affecting the relation of the side gage fingers to the sheet moving device.

46. In a sheet feeding machine, the combination of an endless traveling apron adapted to receive sheets and to convey them over its surface, rollers for supporting and driving said apron, a group of rollers arranged to depress the plane of said apron so as to form a transverse pocket or depression in its face, a stop adjacent to the end of the apron adapted to engage the front edges of the sheets as they pass upon said apron to arrest the sheets in their forward movement, cross bars extending transversely over said apron, a frame adapted to move over said cross bars, side gage fingers carried by said frame one of which extends into said pocket or depression and another of which extends into the space beyond the end of the apron adjacent to the front stop, a sheet moving device carried by said frame adapted to engage the surface of a sheet which has been arrested by the front stop and to draw the sheet laterally against the side gage fingers, and a hand operated device to act on said frame to move it along said cross bars whereby the said side gage fingers and sheet moving device may be adjusted to suit the width or position of the sheets upon the carrier without affecting the relation of said side gage fingers to said sheet moving device.

47. In a sheet feeding machine, the combination of an endless traveling apron adapted to receive sheets and to convey them over its surface, rollers for supporting and driving said apron, a series of independent groups of rollers, the rollers of each group being arranged to depress the plane of said apron so as to form a transverse pocket or depression in its face and the combined action of the several groups of rollers being to form a series of similar pockets or depressions, a stop adapted to engage the front edges of the sheets successively as they pass upon said apron to arrest the sheets in their forward movement, side gage fingers having their lower ends projecting into said pockets or depressions, a sheet moving device adapted to act upon the surface of a sheet which has been arrested by the front stop to draw the sheet laterally against the side gage fingers, cross bars extending transversely above said apron, a frame carrying the side gage fingers and sheet moving device adapted to move over said cross bars, a hand operated device adapted to act on said frame to adjust it upon said cross bars whereby the said side gage fingers and sheet moving device may be adjusted to suit the width or position of the sheets upon the carrier without affecting the relation of said side gage fingers to said sheet moving device, and means to clamp said frame to secure it in any adjusted position.

48. In a machine for feeding sheets from a pack, the combination of a sheet carrier, a stop adapted to engage the front edges of the sheets successively as they are moved forward by the carrier to arrest the sheets in their forward movement, a side gage finger adapted to engage the side edges of the sheets, a frictional pad adapted to engage the surface of a sheet which has been arrested by the front stop, an operating device adapted to move said frictional pad to cause it to act upon a sheet and draw it laterally against the side gage finger, a frame carrying said side gage finger and pad operating device, means to adjust the side gage finger on the supporting frame relatively to the frictional pad, and means to adjust said frame transversely across the machine whereby the gage finger, frictional pad and operating device may be adjusted to suit the width or position of sheets upon the carrier without affecting any adjustment which may have been made between the gage finger and the frictional pad.

49. In a sheet feeding machine, the combination of an endless traveling apron adapted to receive sheets and to convey them over its surface, rollers for supporting and driving said apron, means to depress the surface of the apron at intervals so as to produce transverse pockets extending below the general surface of the apron, a stop adapted to engage the front edges of the sheets successively as they pass upon said apron to arrest the sheets in their forward movement, side gage fingers having their lower ends projecting into said pockets, a frictional pad adapted to engage the surface of a sheet which has been arrested by the front stop, an operating device adapted to move said frictional pad to cause it to act upon a sheet and draw it laterally against the side gage fingers, cross bars extending transversely over said apron, a frame movable on said cross bars and carrying said side gage fingers and pad operating device, means to adjust the side gage fingers on the supporting frame relatively to the frictional pad, and a hand operated device acting on the frame to move it along the cross bars and adjust it to any desired position, whereby the gage fingers, frictional pad and operating device may be adjusted to suit the width or position of the sheets upon the carrier without affecting any adjustment which may have been made between the side gage fingers and the frictional pad.

50. In a sheet feeding machine, the combination with a moving sheet carrier and means to momentarily arrest the sheets in their forward movement of a side gage stop, a movable bar 112, a frictional pad 111 carried thereby, the levers 118 and 119 connected with the bar 112, the link 117, and spring 122 between the levers 118 and 119 and a stationary part respectively, and cams 124 and 125 arranged substantially as described and operating to move the pad 111 to cause it to engage the surface of a sheet which has been arrested and to move it laterally against the side stop.

51. In a sheet feeding machine, the combination with a moving sheet carrier and means to momentarily arrest the sheets in their forward movement of a side gage stop, a movable bar 112, a frictional pad 111 carried thereby, the levers 118 and 119 connected with the bar 112, the link 117, and spring 122 between the levers 118 and 119 and a stationary part respectively, cams 124 and 125 arranged substantially as described and operating to move the pad 111 to cause it to engage the surface of a sheet which has been arrested and to move it laterally against the side stop, and means to retain the finger bar 112 in a permanently raised position with the lever 118 away from contact with the said cams whereby when required the frictional pad 111 may be prevented from acting on the sheets.

52. In a machine for feeding sheets from a pack, the combination of a sheet carrier, a stop adapted to engage the front edges of the sheets successively as they are moved forward by the carrier to arrest the sheets in their forward movement, a side gage adapted to engage the side edges of the sheets, a frictional pad, a cam device to operate said frictional pad to cause it to engage the surface of a sheet which has been arrested by the front stop and to move the sheet laterally against the side gage, an adjustable frame carrying said side gage, frictional pad and cam device, means to adjust said frame transversely across the machine, whereby the said side gage, friction pad and cam device may be adjusted to suit the width or position of the sheets upon the carrier without affecting the relation of the side gage to the frictional pad, a cam shaft carried by said frame to drive said cam device, power distributing devices carried by the machine, adjustable driving devices for operating said cam shaft, a power connection between the said power distributing devices and adjustable driving devices, and a connection between the adjustable frame and the adjustable driving devices whereby they will be moved together and the power connection to the cam shaft will not be broken by the adjusting of the frame which carries it.

53. In a sheet feeding machine, the combination of an endless traveling apron adapted to receive sheets and to convey them over its surface, rollers for supporting and driving said apron, means to depress the surface of the apron at intervals so as to produce transverse pockets extending below the general surface of the apron, a stop adapted to engage the front edges of the sheets successively as they pass upon said apron to arrest the sheets in their forward movement, side gage fingers having their lower ends projecting into said pockets, a frictional pad, a cam device to operate said pad to cause it to engage the surface of a sheet which has been arrested by the front stop and to move the sheet laterally against the side gage fingers, cross bars extending transversely above the apron, an adjustable frame adapted to move over said cross bars and to support said gage fingers, frictional pad, and cam device, a hand operated device adapted to act on said frame to adjust it upon said cross bars whereby the said side gage, frictional pad and cam device may be adjusted to suit the width or position of the sheets upon the carrier without affecting the relation of the side gage to the frictional pad, a cam shaft carried by said frame to drive said cam device, power distributing devices carried by the machine, adjustable driving devices for operating said cam shaft, a power connection between the said power distributing devices and adjustable driving devices, and a connection between the adjustable frame and the adjustable driving devices whereby they will be moved together and the power connection to the cam shaft will not be broken by the adjusting of the frame which carries it.

54. In a sheet feeding machine, the combination of a sheet carrier, lower and upper feeding disks adapted to receive the sheets that are brought forward by the carrier and to deliver them to such devices as are to further act upon them, shoulders formed between the upper feeding disks of a less diameter than the diameter of the disks, vertically vibrating stop fingers adapted to engage the front edges of the sheets successively to arrest them in their forward movement, located below the plane occupied by the moving sheets and arranged to ascend on that side of the intaking line between the lower and upper feeding disks on which the sheets approach the disks and to rest against the said shoulders, all combined and operating to regulate the delivery of the sheets from the carrier to the disks.

55. In a sheet feeding machine, the combination of a sheet carrier, lower and upper feeding rollers adapted to receive the sheets that are brought forward by the carrier and to deliver them to such devices as are to further act upon them, a stop adapted to arrest the sheets successively as they are fed by the carrier to the feeding rollers with the advanced edges of the arrested sheets near the intaking line between the lower and upper feeding rollers, and means to reciprocate the upper feeding roller over a portion of the surface of the lower feeding roller so as to bring the intaking line between the rollers over the edge of a sheet which has been arrested by the said stop without requiring that sheet to be moved from its arrested position, all combined and operating to regulate the delivery of the sheets from the carrier to the feeding rollers.

56. In a sheet feeding machine, the combination of a sheet carrier, lower and upper feeding disks adapted to receive the sheets that are brought forward by the carrier and to deliver them to such devices as are to further act upon them, vertically vibrating stop fingers adapted to engage the front edges of the sheets successively to arrest them in their forward movement and arranged to engage the sheets on that side of the intaking line between the lower and upper feeding disks on which the sheets approach the disks, means to reciprocate the upper feeding disks over a portion of the surface of the lower feeding disks to bring the intaking line between the lower and upper disks over the edge of a sheet which has been arrested by the said stop fingers without requiring that sheet to be moved from its arrested position, and means to vibrate the stop fingers to cause them to move out of the pathway of the sheets as the upper feeding disks reciprocate toward the arrested sheet, all combined and operating to regulate the delivery of the sheets from the carrier to the feeding disks.

57. In a sheet feeding machine, the combination of a sheet carrier, lower and upper feeding rollers adapted to receive the sheets that are brought forward by the carrier and to deliver them to such devices as are to further act upon them, a stop adapted to arrest the sheets successively as they are fed by the carrier to the feeding rollers with the advanced edges of the arrested sheets near the intaking line between the lower and upper feeding rollers, an oscillating frame at each end of the rollers carrying the upper roller, and means to oscillate said frames, consisting of arms 140 carried by said frames, the shaft 141, arms 142, springs 144 and a cam device to rock the shaft 141 all combined and operating substantially as described to regulate the delivery of the sheets from the carrier to the feeding rollers.

58. In a sheet feeding machine, the combination of a sheet carrier, lower and upper feeding disks adapted to receive the sheets from the carrier and to deliver them to such devices as are to further act upon them, vertically vibrating stop fingers located below the horizontal plane occupied by the moving sheets arranged to operate on that side of the intaking line between the lower and upper feeding disks on which the sheets approach the disks and adapted to engage the front edges of the sheets successively to arrest them in their forward movement with the front edges of the sheets near to said intaking line, a shaft to carry the lower feeding disks, a shaft to carry the upper feeding disks, bearings for each of said shafts, oscillating frames carrying the bearings of the shaft of the upper feeding disks, the rocker bar 150 carrying the stop fingers, means to oscillate said frames and to rock the bar 150 consisting of arms 140 carried by said frames, the shaft 141, arms 142, springs 144, a cam device to rock the shaft 141, the arms 154 carried by the said rocker bar, cams 155 carried by said frames and the springs 157, all combined and operating substantially as described to regulate the delivery of the sheets from the carrier to the feeding disks.

59. In a sheet feeding machine, the combination of a sheet carrier, the lower feeding roller having disks 134, the upper feeding roller having disks 136, oscillating frames 138 carrying the upper roller, arms 140, rocking shaft 141, arms 142, springs 144, arm 145, rod 146, lever 147, cam 148, rocker bar 150, stop fingers 151, lips 152, arms 154, cams 155, and springs 157, operating substantially as and for the purpose described.

60. In a sheet feeding machine, the combination of a sheet carrier, lower and upper feeding rollers adapted to receive the sheets that are brought forward by the carrier and to deliver them to such devices as are to further act upon them, a stop adapted to arrest the sheets successively as they are fed by the carrier to the feeding rollers with the advanced edges of the arrested sheets near the intaking line between the lower and upper feeding rollers, means to reciprocate the upper feeding roller over a portion of the surface of the lower feeding roller so as to bring the intaking line between the rollers over the edge of a sheet which has been arrested by the said stop without requiring that sheet to be moved from its arrested position, all combined and operating to regulate the delivery of sheets from the carrier to the feeding rollers, and a sheet guide arranged across the machine forward of the lower feeding roller to direct the sheets as they pass from between the feeding rollers.

61. In a sheet feeding machine, the combination of a sheet carrier, lower and upper feeding rollers adapted to receive the sheets that are brought forward by the carrier and to deliver them to such devices as are to further act upon them, a stop adapted to arrest the sheets successively as they are fed by the carrier to the feeding rollers with the advanced edges of the arrested sheets near the intaking line between the lower and upper feeding rollers, means to reciprocate the upper feeding roller over a portion of the surface of the lower feeding roller so as to bring the intaking line between the rollers over the edge of a sheet which has been arrested by the said stop without requiring that sheet to be moved from its arrested position, all combined and operating to regulate the delivery of the sheets from the carrier to the feeding rollers, a rocker bar arranged across the machine forward of said lower feeding roller, a sheet guide plate attached to said bar and adapted to rock with it, and means to rock said bar to adjust the guide plate to different angles relatively to the direction in which the sheets are moving and to secure the plate in any adjusted position.

In testimony of which invention I have hereunto set my hand.

JOHN HENRY KNOWLES.

Witnesses:
ERNEST HOWARD HUNTER,
C. H. NEWCOMB.